US012596961B1

(12) United States Patent
Eberhardt et al.

(10) Patent No.: US 12,596,961 B1
(45) Date of Patent: Apr. 7, 2026

(54) LOCAL DEVICE EMBEDDINGS FOR AUTOMATION

(71) Applicant: Amazon Technologies, Inc., Seattle, WA (US)

(72) Inventors: Sven Eberhardt, Seattle, WA (US); Amir Salimi, Seattle, WA (US); Jin Long Lee, Seattle, WA (US); Maisie Wang, Seattle, WA (US); Akanksha Gupta, Seattle, WA (US); Kaustubh Anilkumar Vibhute, Austin, TX (US); Biwei Tao, Vancouver (CA); Caglar Iskender, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1180 days.

(21) Appl. No.: 17/490,343

(22) Filed: Sep. 30, 2021

(51) Int. Cl.
| | |
|---|---|
| *G06N 20/20* | (2019.01) |
| *G06F 18/2135* | (2023.01) |
| *G06F 18/214* | (2023.01) |
| *G06F 40/20* | (2020.01) |
| *G06N 3/04* | (2023.01) |
| *G06N 3/044* | (2023.01) |
| *G06N 3/045* | (2023.01) |
| *H04W 4/02* | (2018.01) |

(52) U.S. Cl.
CPC ....... *G06N 20/20* (2019.01); *G06F 18/21355* (2023.01); *G06F 18/214* (2023.01); *G06F 40/20* (2020.01); *G06N 3/04* (2013.01); *G06N 3/044* (2023.01); *H04W 4/023* (2013.01); *G06N 3/045* (2023.01)

(58) Field of Classification Search
CPC ............ G06N 3/02; G06N 3/04; G06N 3/044; G06N 3/045; G06N 3/0455; G06N 20/00; G06N 20/10; G06N 20/20; G06F 18/21355; G06F 18/214; G06F 40/20; H04W 4/023
See application file for complete search history.

(56) References Cited

U.S. PATENT DOCUMENTS

| | | | | |
|---|---|---|---|---|
| 2019/0101305 A1* | 4/2019 | Hada | .......................... | F24F 11/30 |
| 2019/0384821 A1* | 12/2019 | Alders | .............. | G06F 16/90332 |
| 2020/0156435 A1* | 5/2020 | Patil | ................... | B60H 1/00742 |
| 2021/0026750 A1* | 1/2021 | Shukla | .................. | G06F 11/263 |
| 2021/0247924 A1* | 8/2021 | Seo | ...................... | G06F 13/4234 |
| 2023/0250985 A1* | 8/2023 | Noda | ....................... | F24F 11/62 |
| | | | | 706/12 |

* cited by examiner

*Primary Examiner* — Shane D Woolwine
(74) *Attorney, Agent, or Firm* — K&L Gates LLP

(57) ABSTRACT

Devices and techniques are generally described for local device embeddings for automation. In various examples, first data representing first state change data for network-connected computing devices configured in communication with a first network may be determined. The first data may be input into a first machine learning model. In some examples, the first machine learning model may generate first embedding data representing a combination of the first data and second data. In some examples, the second data may represent historical state change data for the network-connected devices. In some examples, the first embedding data may be stored in memory. A first action may be performed by a first network-connected device based at least in part on the first embedding data.

20 Claims, 11 Drawing Sheets

600

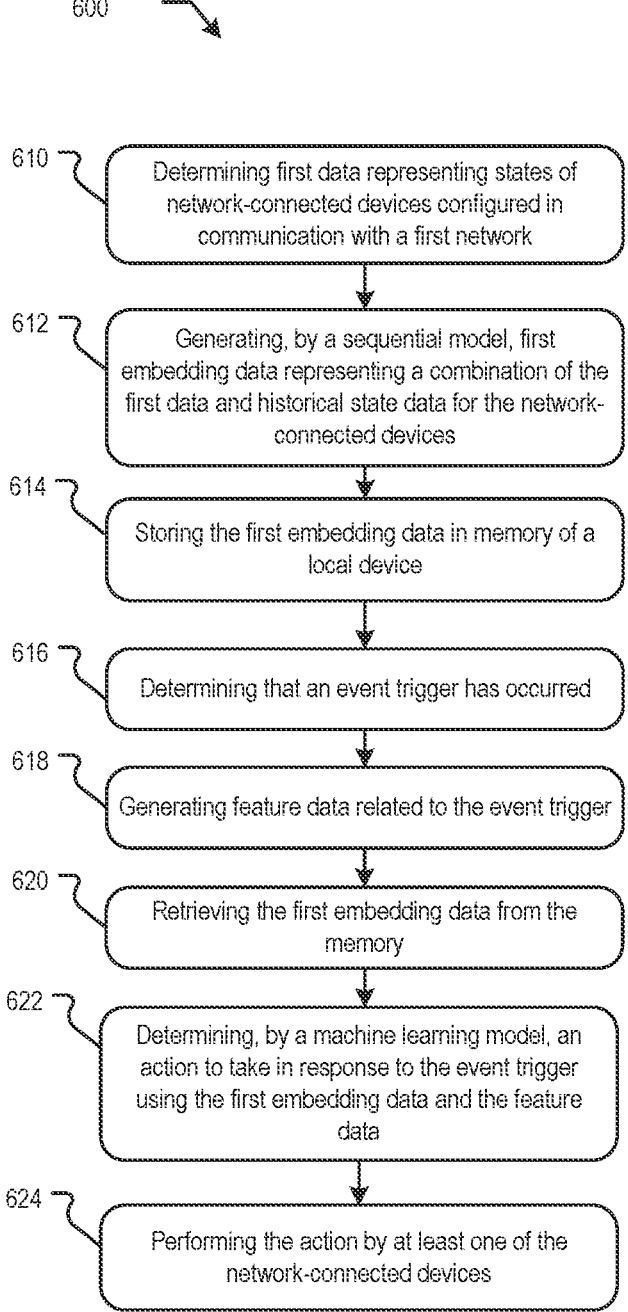

610    Determining first data representing states of network-connected devices configured in communication with a first network 612    Generating, by a sequential model, first embedding data representing a combination of the first data and historical state data for the network-connected devices 614    Storing the first embedding data in memory of a local device 616    Determining that an event trigger has occurred 618    Generating feature data related to the event trigger 620    Retrieving the first embedding data from the memory 622    Determining, by a machine learning model, an action to take in response to the event trigger using the first embedding data and the feature data 624    Performing the action by at least one of the network-connected devices

FIG. 6

| Device ID | Group(s) | State | State change metadata | Unit |
|---|---|---|---|---|
| Smart_light_3 | kitchen | On [19:05-current] | Setting 100% Brightness, 2700K | Zone 1 |
| Smart_light_1 | Living room | On [19:05-19:15] Off [19:15-current] | Setting 50% Brightness, 2700K | Zone 2 |
| Front door lock | Front door | Locked [19:05-current] | Geofence enabled | Zone 1 |
| ... | ... | ... | ... | |

| Natural language processing system 220 | ⬌ | Smart-home entity-recognition component 1202 |

Smart Home System 1157

Local state embedder 160

| Smart-home Speechlet 1158 | ⬌ | Smart-Home Orchestrator 1204 | ⬌ | Smart-Home GUI 1206 |

Internet-of-things comp. 1106

Data Store(s) 1052

LOCAL DEVICE EMBEDDINGS FOR AUTOMATION

BACKGROUND

Internet-of-things (IoT) devices are devices with embedded sensors, software, processing capability, and/or other technologies that can communicate with one another and/or with one or more remote systems via one or more networks. Internet-of-things devices are sometimes referred to as network-connected "smart" computing devices as such devices may take actions based on logic and/or input sensor data that are appropriate for a given set of circumstances. For example, smart lights may be triggered based on movement detected by another device.

BRIEF DESCRIPTION OF DRAWINGS

FIG. 6 depicts a flow chart showing an example process for determining an action to be performed based on state embedding data for network-connected devices, in accordance with various aspects of the present disclosure.

DETAILED DESCRIPTION

Figure 1:
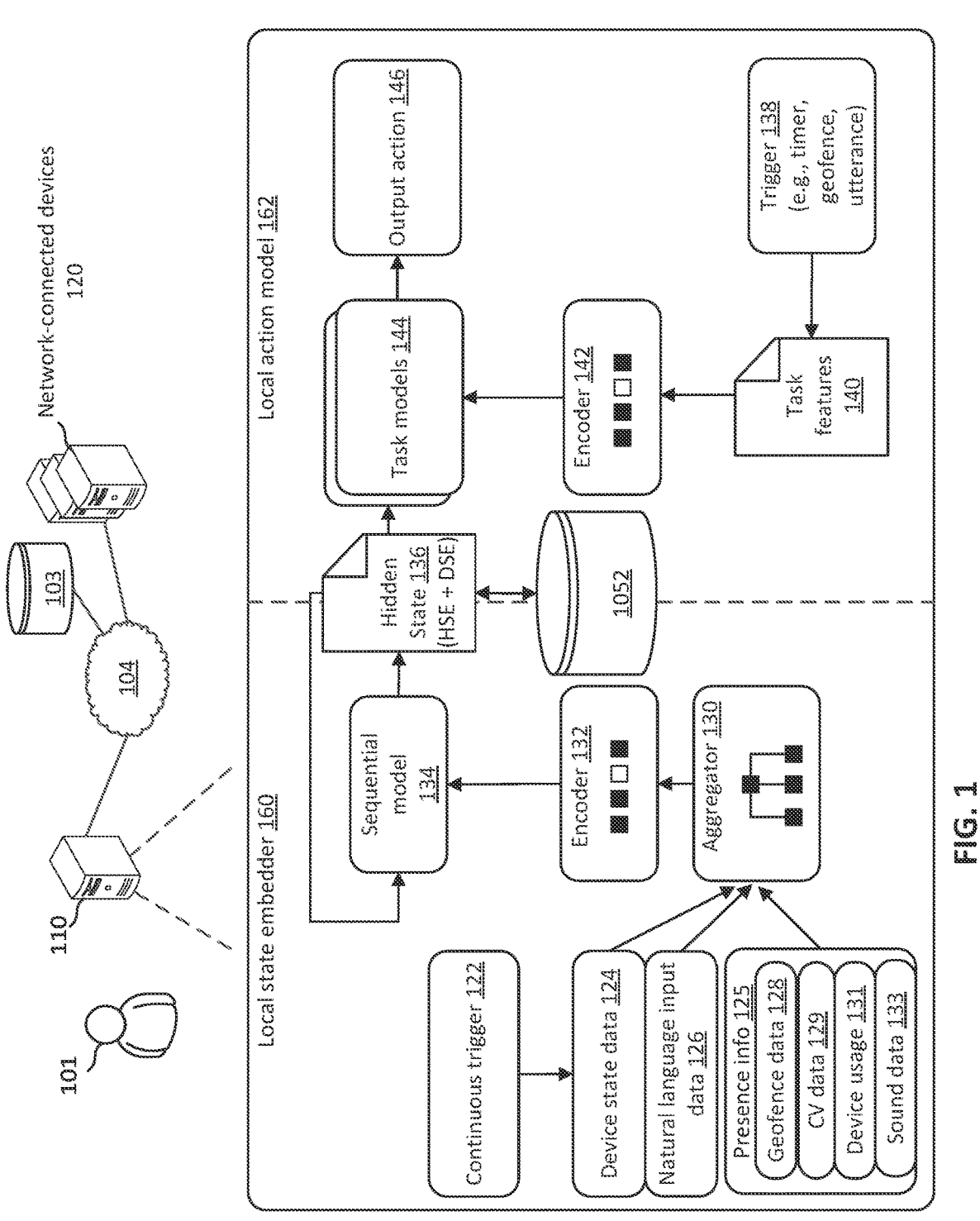
FIG. 1 is a block diagram illustrating a local state embedder and action model for network-connected devices, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Internet-of-Things (IoT) devices are configured with network communication capability and/or other computing functions allowing these devices to send data to and/or receive data from other devices. Examples of IoT devices include networked appliances, smart phones, light bulbs ("smart bulbs"), electrical outlets ("smart outlets"), door locks (e.g., "smart locks"), voice-enabled personal assistant devices, smart speakers, etc. As such devices become more and more prevalent in both the home, office, public spaces, and elsewhere generally, and as the technology matures, new services and features are being developed. For example, with user permissions and as permitted by all local regulations, it may be possible to learn thermostat settings, light usage patterns, home security preferences, appliance usage patterns, etc., based on one or more of historical usage data of such devices along with explicit user preferences/controls for the devices. Such learned/predicted settings may be used to take automated actions to make users' lives better, more environmentally friendly, and more efficient. For example, lights may be automatically controlled to turn off when not needed to be on, thermostat settings may be adjusted to save money and energy when comfort is not impacted, etc.

Machine learning algorithms may be used to generate models that may determine actions that can optionally (e.g., with the appropriate user permissions) be automatically taken by one or more smart devices without requiring explicit user controls. For example, a neural network and/or other type of system component may be trained to determine when to turn on and/or off a smart light based on historical usage of the light, user presence, time of day, weather (e.g., clear skies vs. cloudy skies) and various other input data. Users can explicitly override such automated actions if the user prefers not to have the actions performed automatically. In some examples, instead of having an action automatically performed, the user may be prompted (e.g., by a voice assistant, cell phone/computer visual notification, or other prompt) to inquire whether the predicted action should be performed. Additionally, users may disable such automated actions if the user prefers manual control of the devices.

In many cases, the data used by such machine learning models to determine whether an action should be taken and/or to predict which action may be appropriate in a given set of circumstances is related to the current state and/or past usage of network-connected devices in the relevant setting (e.g., a user's home) along with various other information (e.g., weather, time of day, day of week, device type, etc.). If the machine learning models used to predict actions and/or control smart devices to perform automated tasks are executed remotely, such data may be sent over one or more networks to a backend system executing the machine learning model for prediction. However, sending such device data over networks to a remote machine learning model has a latency cost. In addition, some users may prefer to not send such data for privacy-related or other reasons, since the data relates to the operation of devices within the relevant environment or other setting (e.g., within the user's home). Accordingly, entities maintaining such backend models may implement strict privacy controls to ensure the privacy of sensitive user data.

Described herein are various systems and methods that may be used to store current and historical device usage data (e.g., current state data and historical state data) locally in a compressed representation that preserves user privacy and reduces if/when data is shared with other devices over a network. In various examples, a sequential network, such as a recurrent neural network (RNN) or other machine learning model may be executed on one or more local network-connected devices. A hidden state embedding of the RNN may be continually updated (e.g., on a continuous cycle, such as every second, minute, 15 minutes, hour, day, week, or other suitable timeframe) with aggregated local device usage data at each time step of the RNN (e.g., each time input data is processed by the RNN). This hidden state embedding comprises a compressed representation of the state of the network-connected devices communicating on the local network (e.g., within the "smart home"). More generally, a hidden state of an RNN is a numeric representation of the previous inputs to the RNN (e.g., the states of the RNN at time steps prior to the current time step). In an example implementation, an initial hidden state ($S_{initial}$) may be a vector of zeros (or any other desired initialized state) multiplied by the initial hidden state weight ($h_w$) and added to the hidden state bias ($h_b$). The input at time step t (e.g., $x_t$) is multiplied by the input weight $i_w$ and the input bias $i_b$ is added to that result. The updated hidden state at time step t ($S_t$) may be calculated using an activation function that combines the input and initial hidden state (e.g., tanh). As such, hidden state calculation at time step t may be represented as:

$$S_t = f((i_w x_t + i_b) + (h_w S_{initial} + h_b))$$

The hidden state embedding data may be used to perform a variety of prediction tasks. For example, the hidden state embedding data may be sent as an input to a task-specific machine learning model (e.g., a "task model") trained to determine if a particular action should be taken. For example, the hidden state embedding data may represent that the user has previously left the home or office (based on a mobile device associated with the user moving beyond a geofence surrounding the location) and may represent state data (e.g., "ON" or "OFF") for smart lights within the home. This hidden state data may be among the inputs to a task model used to determine whether one or more smart lights that are currently in an "ON" state should be automatically turned off. It should be noted that users may selectively control whether data is shared, whether automated actions are permissible or not, whether the user should be prompted prior to an automated action being taken, among other things.

As used herein, "states" of network-connected devices and/or state data for network-connected devices refers to data describing usage of the device during the relevant period (e.g., during the previous 15 minutes, 1 hour, 1 minute, etc.) as well as to data describing a change of state of a device (e.g., a smart lock switching from an unlocked state to a locked state or a smart thermostat changing a temperature setting). Representing network-connected devices' states using a hidden state embedding of a machine learning model not only allows for such information to be stored locally on edge-based computing devices that are often resource constrained, but also alleviates privacy issues associated with sending potentially sensitive user data to remote locations over the Internet. Additionally, hidden state embeddings can be considered a form of encryption, since the embedding data does not have any human-discernable meaning outside the context of the relevant machine learning models that generate the embeddings and/or consume the embeddings (e.g., the task models). Further, locally storing such information as well as local execution of the various task models that use such local state embeddings for prediction allows for more responsiveness, lower latency, and reduced cloud storage requirements. Additionally, individual devices do not need to maintain device history in on-device memory as such information may be off-loaded to the machine learning model generating the hidden state embeddings (e.g., an RNN). This may allow the devices to be designed with minimal local memory requirements for this functionality to be enabled. In some further examples, user utterances (e.g., user requests used to control natural language processing enabled devices) and aggregations of user utterances may be represented by the hidden state embedding, as opposed to storing the user utterances themselves—further reducing privacy concerns that may be associated with storage of past user natural language processing utterances. Additionally, use of a local sequential model to store the hidden state embeddings may enable the hidden state embeddings to be updated and consumed even when no internet connection is available.

Automatic speech recognition (ASR) is a field of computer science, artificial intelligence, and linguistics concerned with transforming audio data associated with speech into text data and/or other ASR output data representative of that speech. Natural language understanding (NLU) is a field of computer science, artificial intelligence, and linguistics concerned with enabling computers to derive meaning from text input containing natural language, resulting in specific executable commands or other type of instructions. As described in further detail below, in some examples, NLU processing may include multiple different processes that may be executed for a given natural language input in order to determine a semantic interpretation of the natural language input. Text-to-speech (TTS) is a field of computer science, artificial intelligence, and linguistics concerned with enabling computers to output synthesized speech. ASR, NLU, and TTS may be used together as part of a natural language processing system. As used in, natural language input data may comprise audio data (e.g., representing a user request or command), text data, and/or other representation data representing natural language for input into a natural language processing system.

As used herein, user utterances, input text data, and/or any form of data input to a speech processing system ("input data") may be described by "request data" and/or "user request data." Such request data may change forms many times during processing of the request data by various components of the speech processing system. For example, initially the request data may be audio data and/or input text data representing a user question. The audio data may be transformed into text data and/or other ASR output data by an ASR component of the speech processing system. The text data and/or other ASR output data may be transformed into intent data by an NLU component of the speech processing system. The intent data may be used by a speech processing application (e.g., a skill) to perform an action (e.g., to generate action data that may be processed in order to take some corresponding action such as answering a user's question, playing video, playing audio, etc.). "Request data" and/or "user request data" may refer to any data related to an input request to a speech processing system (e.g., including the various data forms described above, as each of the aforementioned data types relate to an input request to the speech processing system). In general, as used herein, speech processing "applications" may be any software (and/or combination of software and hardware) used during speech processing to take an action in response to input request data (e.g., natural language inputs such as user utterances and/or text). Such applications may include speech processing skills, speechlets, and/or other types of speech processing software.

In various examples, speech processing systems may determine an action to take for processing particular request data according to an interpretation of the natural language input (represented by the request data), as determined by NLU. Dialog sessions may be carried out between a user and a natural language processing system. A dialog session may include multiple turns of dialog between the user and TTS synthesized speech output by the natural language processing system. In a simple example, a user request (e.g., "Computer, turn on the kitchen light") followed by a natural language response (e.g., "OK, turning on the kitchen light at 80% brightness") constitutes a dialog session with two turns. Dialog sessions may include any number of turns. For example, in the previous example of controlling the kitchen light, the user may respond by saying "No, set the kitchen light to 100% brightness." The dialog session may continue with the natural language processing system outputting the synthesized speech "OK, setting kitchen light to 100% brightness." In this example, the dialog session may have four turns (e.g., two user turns and two voice assistant turns).

In various examples, network-connected device state data may be aggregated periodically. Accordingly, in such examples, the entire dialog session (as opposed to individual utterances and/or system responses) may be aggregated and input into the RNN (or other embedding generator) and the hidden state embedding generated may represent the entire dialog session (along with any other device state data aggregated during the relevant time period and fed into the embedding generator).

Thereafter, the hidden state embedding may be used to predict and/or execute an action. For example, the user may request "Computer, turn on the kitchen light" again at a time that is similar to the previous time that the user requested this light to be turned on. A task model may predict that the user wants the kitchen light to be set to 100% brightness based on the previous dialog session (as represented by the hidden state embedding). This is merely one example of a task and an action prediction. In other examples, automated actions may be predicted that are not initiated by a user request. For example, a task model may predict that specific smart lights should be turned off based on historical usage data and based on device state data (e.g., data indicating which lights are currently in an "ON" state). The historical usage data and/or the device state data may be represented by the hidden state embedding.

The various techniques described herein may be used in a variety of contexts, including in natural language processing enabled devices (e.g., devices employing voice control and/or speech processing "voice assistants") and/or systems. Examples of speech processing systems and/or voice-enabled personal assistants include the Siri system from Apple Inc. of Cupertino, California, voice-enabled actions invoked by the Google Assistant system from Google LLC of Mountain View, California, Dragon speech recognition software from Nuance Communications of Burlington, Massachusetts, the Cortana system from Microsoft of Redmond, Washington, the Alexa system from Amazon.com, Inc. of Seattle, Washington, etc. Other examples of smart home devices and/or systems that may use the local state embedder(s) and/or local action models described herein may include Google Nest Smarthome products from Google LLC, HomeKit devices from Apple Inc., etc. In addition, the local state embedder(s) and/or local action models described herein may be implemented on a natural language processing enabled device and/or on another device that is communicating on a network with one or more other network-connected devices (e.g., IoT devices). For example, the local state embedder(s) and/or local action models described herein may be executed on a smart home "hub" device configured to control various other IoT devices on premises. In some other examples, the local state embedder(s) and/or local action models described herein may be executed on a mobile device (e.g., on a user's phone, laptop, etc.) or a desktop device.

Natural language processing enabled devices may include one or more microphones (e.g., far-field microphone arrays) used to transform audio into electrical signals. Speech processing may then be performed, either locally by the speech processing enabled device, by one or more other computing devices communicating with the speech processing enabled device over a network, or by some combination of the natural language processing enabled device and the one or more other computing devices. In various examples, natural language processing enabled devices may include and/or may be configured in communication with speakers and/or displays effective to output information obtained in response to a user's spoken request or command, and/or to output content that may be of interest to one or more user's.

Storage and/or use of data related to a particular person or device (e.g., device state data, contextual data, and/or any personal data) may be controlled by a user using privacy controls associated with a speech processing enabled device and/or a companion application associated with a speech processing enabled device. Additionally, as described herein, such data may be stored as a hidden state embedding of a machine learning model in a form that is not interpretable by humans and/or by computing systems apart from the specific machine learning models that have been trained using such embeddings. Users may opt out of storage of personal, device state, and/or contextual data and/or may select particular types of personal, device state, and/or contextual data that may be stored while preventing aggregation and storage of other types of personal, device state, and/or contextual data. Additionally, aggregation, storage, and use of personal, device state, and/or contextual information, as described herein, may be compliant with privacy controls, even if not legally subject to them. For example, personal, contextual, device state, and other data described herein may be treated as if it was subject to acts and regulations, such as the Health Insurance Portability and Accountability Act (HIPAA) and the General Data Protection Regulation (GDPR), even if it is not actually subject to these acts and regulations. In various examples, the data aggregated in hidden states and/or used by machine learning techniques described herein for prediction may be used only in accordance with user permission, in compliance with any relevant laws and/or policies. Additionally, users may opt out of data collection, and/or may opt to delete some or all of the data used by the various techniques described herein, even where deletion or non-collection of various data may result in reduced functionality and/or performance of various aspects of the systems described herein.

Natural language processing systems may be configured with multiple applications (e.g., thousands, tens of thousands, or more applications) that can be used to potentially respond to a user request. Applications may be referred to herein as "skills". Natural language processing systems may be effective to process spoken and/or textual natural language inputs to determine data representing a semantic understanding of the inputs. Skills may include any application effective to receive inputs from a natural language processing system in order to take one or more actions based on those inputs. For example, a speech processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.). In various examples, skills may execute one or more of the task models described herein for performance of skill-specific actions.

In various examples, a natural language processing enabled device may include a wakeword detection component. The wakeword detection component may process audio data captured by microphones of the speech processing enabled device and may determine whether or not a keyword (e.g., a wakeword) is detected in the audio data. When a wakeword is detected, the speech processing enabled device may enter a "sending mode" in which audio detected by the microphones following the wakeword (e.g., data representing user request data spoken after the wakeword) may be sent to natural language processing computing component(s) (either locally or remotely) for further speech processing (e.g., ASR, NLU, etc.). In various examples, the wakeword detection component may be used to distinguish between audio that is intended for the natural language processing system and audio that is not intended for the natural language processing system.

FIG. 1 is a block diagram illustrating a local state embedder and action model for network-connected devices, according to various embodiments of the present disclosure. In the example depicted in FIG. 1, one or more computing devices 110 may be used to implement the local state embedder 160 and/or the local action model 162. The local state embedder 160 and the local action model 162 may be "local" in the sense that these systems are executing on one or more computing devices 110 that are local (e.g., within the same premises and/or communicating via the same local area network (LAN)) to one or more network-connected devices 120 (e.g., IoT devices configured in communication with computing device(s) 110 and/or non-transitory computer-readable memory 103 over a network 104. The one or more network-connected devices 120 may be configured in communication with one another over the network 104. Network 104 may be a communication network such as a local area network (LAN). However, the various computing devices (e.g., computing device(s) 110 and/or network-connected devices 120) in FIG. 1 may also be configured in communication with a wide area network (e.g., the Internet). The computing device(s) 110 and/or network-connected devices 120 may communicate with non-transitory computer-readable memory 103 (e.g., either locally or over network 104). Non-transitory computer-readable memory 103 may store instructions that may be effective to perform one or more of the various techniques described herein. For example, the instructions may be effective to implement (in whole or in part) the local state embedder 160 and/or the local action model 162, as described herein.

In various examples, a user 101 may control one or more of the network-connected devices 120 and/or may control settings of automatic functionality of the one or more network-connected devices 120. Examples of the network-connected devices 120 may include natural language processing enabled devices, smart appliances, smart lights, home security systems, mobile devices (e.g., phones, tablets, etc.), wearable devices (e.g., a smart watch), smart televisions, routers (and/or other access points), smart hubs (e.g., computing devices used to control and/or store data from other smart devices on the premises), various sensors/embedded systems (e.g., thermometers, cameras, etc.), robot vacuums (and/or other network-connected robots), etc. In various examples, the user 101 may set up one or more geofences. A geofence may be a perimeter and/or other defined area and/or line defined using GPS coordinates. Crossing a geofence (e.g., leaving or entering a perimeter defined by a geofence) may be used to trigger various other actions. For example, when a user 101 leaves a geofence surrounding their house, the user may have enabled a smart lock implemented by one of the network-connected devices 120 to automatically lock, provided the user has their keys (e.g., as determined using a sensor on the user 101's keys).

Regardless of the specific network-connected devices 120, local state embedder 160 may be effective to aggregate state data describing current states and/or state changes of the various network-connected devices 120. In some implementations, collection and/or aggregation of state data may be triggered continuously, over time, by continuous trigger 122. For example, continuous trigger 122 may be a periodic trigger (e.g., a time cycle associated with a threshold time). For example, state data from network-connected devices 120 may be aggregated continuously, in 15 minute intervals (or any other suitable interval). When an amount of time has elapsed that exceeds the predefined time threshold since the last embedding was generated (e.g., 15 minutes) the current batch of device state data 124, natural language input data 126, presence information (e.g., data suggesting one or more persons interacting within the space), etc., may be aggregated by aggregator 130, encoded by encoder 132, input into a sequential model 134 such as a recurrent neural network (RNN) or other type of machine learning model and used to generate hidden state embedding 136. In some cases, other machine learning models apart from a sequential model may be used. For example, in some implementations, a transformer model may be used to generate an embedding that captures current and historical device states, in accordance with the techniques described herein.

Device state data 124 represents the various states and state changes of the network-connected devices 120 since the last hidden state embedding 136 was generated (e.g., from the previous time step). Device state data 124 may include information such as content currently in playback by a smart speaker, light state information (e.g., ON or OFF and brightness and/or temperature settings), changes in state (e.g., a time at which a smart light was switched from ON to OFF), thermostat settings, and so on. Other information, such as contextual information, may also be aggregated periodically (or semi-periodically) by the continuous trigger 122. For example, weather information (e.g., provided by an external weather service and/or by local sensors), brightness information (determined using geolocation data and time of day data), etc. may be determined. In addition, natural language input data 126 (e.g., utterances, intents, domains, slot data received during one or more dialog sessions occurring within the last time interval of the continuous trigger 122) may be aggregated by aggregator 130 during each time interval of the continuous trigger. In some examples, presence information 125 may also be aggregated during each time interval of the continuous trigger. Presence information 125 may be information about the presence (or absence) of people in the relevant space (e.g., the users home). Presence information 125 may include such data as geofence data 128 (e.g., persons and/or objects entering and/or leaving one or more defined geofences), computer vision data 129 indicating one or more people, tracked objects, and/or animals detected in camera feeds within a monitored space, device usage data 131, sound data 133 (such as ultrasound detection of movements) may be aggregated during each time interval of the continuous trigger. It should be appreciated that the foregoing examples are non-exhaustive and any type of data may be aggregated and used to update the state embedding according to the desired implementation. This information/data may be aggregated and embedded in hidden state embedding 136 at each time interval of continuous trigger 122, as described in further detail below. Further, at each time interval, the sequential model 134 may combine the current input (e.g., aggregated state data from the current time interval) with the previously-stored hidden state embedding 136 to generate a combined representation of historical smart home data (or historical data describing the IoT device usage at any other applicable premises).

Although continuous trigger 122 may be used to periodically trigger an embedding generation by the sequential model 134. In some examples, some events may trigger out-of-cycle embedding generation (e.g., out-of-cycle triggering events). For example, certain utterances may be classified in such a way as to trigger immediate embedding generation by sequential model 134. In various other examples, instructions to change the operational state of an alarm panel of a security system, new device discovery, a person entering a geofence, etc., may trigger an out-of-cycle embedding generation. The specific events that result in an out-of-cycle embedding generation event are implementation specific, and may be configurable by user 101 and/or by an administrator of the local state embedder 160. In an out-of-cycle embedding generation event, the data that has been aggregated by aggregator 130 since the last time interval of continuous trigger 122 (e.g., since the last embedding generation) may be encoded (along with the out-of-cycle event) and fed into the sequential model 134 to generate an updated hidden state embedding 136 (e.g., updated embedding data).

Aggregator 130 may be a component effective to collect all relevant data (e.g., device state data 124, natural language input data 126, geofence data 128, etc.) since the last embedding generation (e.g., during 15 minute cycles—although any interval of time may be used). The data aggregated by aggregator 130 may be stored in memory and may be structured data of the form output by the various devices from which the data were received. In various implementations, the aggregator 130 may perform various pre-processing operations on the structured data received from the various devices to prepare the data for input into the encoder 132.

Encoder 132 may transform the aggregated data output by the aggregator 130 into a numerical representation (e.g., a vector, feature map, etc.) for input into the sequential model 134 and/or other machine learning model that is configured to generate the hidden state embedding 136. In various examples, the encoder 132 may be a neural network (e.g., a feed forward network (FFN)) which may be either pre-trained and/or which may be trained end-to-end with the sequential model 134 and/or with the task models 144.

sequential model 134 may receive the encoded data that was either generated during the last time interval of the continuous trigger 122 or which has been generated until an out-of-cycle event has occurred and may combine such information with a current hidden state embedding 136 (retrieved from data store 1052) to generate an updated hidden state embedding 136. Since this operation occurs continuously, the hidden state embedding 136 that is stored by the sequential model 134 at a current time step represents the current state of the network-connected devices 120, but also historical information about states of the network-connected devices 120.

The hidden state of an RNN allows the RNN to model short term dependencies over time steps. The hidden state embedding 136 retains information from one time step to another flowing through the RNN units. The current time step's hidden state is calculated using information of the previous time step's hidden state and the current input. In some examples, the sequential model 134 may be implemented as a long short term memory (LSTM) model. LSTM models include units known as "cells" that persist values over arbitrary time intervals and use different gates to control how long information is persisted over different time intervals. In addition, other implementations are also possible for generating the hidden state embedding 136. For example, a transformer-based architecture may be employed, a gated recurrent unit (GRU), etc. In general, the sequential model 134 (or other model) takes the current hidden state embedding 136 stored by the sequential model 134, concatenates it with the encoded data output by the encoder 132, and runs a forward pass through the sequential model 134 to generate an updated hidden state embedding 136 that is stored locally on device 110 (and/or in memory 103). Hidden state embedding 136 includes two types of embeddings. The first is described herein as a "home state embedding" (HSE). This represents information from all data sources aggregated by aggregator 130 (e.g., state data for all network-connected devices 120 as well as any other data that is aggregated). Accordingly, the HSE represents not only the current state of the home (or other premises), but also historical state data for the home that is persisted by the HSE from previous time steps. Additionally, the hidden state embedding 136 includes device-specific embedding data (DSE) which are respective embeddings specific to each of the network-connected devices 120 (e.g., device-specific embeddings for each smart device within the smart home). In some examples, the hidden state embedding data may include not only device-specific embedding data (DSE), but may also include data aggregated at other levels. For example, a user may have two homes or two different zones within a home (e.g., two separate rooms). Each home or zone may be associated with its own unit ID. Accordingly, device state data 124, natural language input data 126, presence information 125, etc., may be aggregated per unit to enhance the utility of the predictive capabilities of downstream task models 144. This unit specific data may be embedded using the sequential model 134 similar to the HSE and DSE described above. Unit embeddings generated by the sequential model 134 may also pertain to specific users (e.g., instead of to (or in addition to) specific physical spaces such as buildings, rooms, floors, etc.).

The HSE and the DSE of the hidden state embeddings 136 have no meaning outside the context of the specific machine learning architecture described herein. Accordingly, encoding smart device usage data (and/or other contextual data) in a hidden state embedding of an RNN provides privacy protection for sensitive user data. Hidden state embeddings 136 (including HSE, DSE, and/or unit-specific embeddings) may be stored in a data store 1052 (e.g., a persistent memory).

The hidden state embeddings 136 may be used by the local action model 162 as an input to task models 144 in order to determine appropriate actions to take based on the current state of the network-connected devices 120 as well as historical usage of the network-connected devices 120 (as represented by the hidden state embeddings 136).

The trigger 138 may represent a trigger that occurs when an automation opportunity arises. In some examples, the trigger 138 may be associated with performance of a first action by a first internet-of-things device. The opportunities for automated action may be triggered on a timer and/or may be triggered based on specific, pre-defined events (e.g., a geofence is crossed by an individual and/or device, a specific utterance/intent is determined by a natural language processing system, it is getting dark outside (as determined using time of day and geolocation data), etc.). Additionally, combinations of specific events may be used as a trigger 138. For example, if a user says "Goodnight, Alexa" and the user's door is unlocked, this may be a trigger that may result in an output action 146 whereby a natural language processing enabled device and/or a smart speaker outputs the synthesized speech, " . . . by the way, your front door is currently unlocked. Would you like for me to lock it?" Allowing the user 101 to selectively control a smart lock for the user 101's front door. A trigger 138 may be specific to an automation opportunity. Such automation opportunities may be hard coded and/or may be learned using machine learning models. The output action 146 may include taking a particular action automatically (e.g., locking a door when a user says "Goodnight"), and/or may include outputting a prompt and/or a recommendation, such as using a voice assistant to output the prompt "The front door is unlocked. Would you like for me to lock it?" when the user says "Goodnight"). In other examples, the output action 146 may include updating a home screen of an internet-of-things device that includes a screen. For example, a user may have a smart doorbell with an integrated camera. Motion may be detected using the smart doorbell (and/or by an associated motion detector). The detection of motion may be a trigger 138 and the output action 146 may be to update a home screen of the internet-of-things device to show the live video feed captured by the smart doorbell camera. In some other examples, the output action 146 may be provided through a mobile application, such as an application executing on a user's smart phone.

In various examples, different triggers 138 and automation opportunities may be associated with different devices and/or with different groups of devices among the network-connected devices 120. In the previous example, the devices implicated by the trigger may be the natural language processing enabled-device and/or smart speaker that the user is interacting with as well as any smart locks and/or smart lights in the user's home. For example, because the user 101 has indicated that the user 101 is going to bed (by saying "Goodnight, Alexa") the trigger 138 may indicate that any smart lights having an ON state and any smart locks having an unlocked state may be implicated by this trigger 138. Accordingly, task features 140 may relate to the specific action opportunity. In the current example this may include current device states of the implicated smart locks and smart lights, local time (e.g., which may be useful in determining whether the user is going to sleep), occupancy of the premises, etc., along with features specific to the opportunity (e.g., the intent determined from the user 101's utterance "Goodnight, Alexa" may be a sleep mode intent used to put the natural language processing enabled device into sleep mode.

These task features 140 that are specific to the automation opportunity and trigger 138 may be collected as structured data and may be transformed by encoder 142 into a numerical representation (e.g., a vector, feature map, a one-hot embedding, etc.) for input into the task model 144 that is specific to the automation opportunity. In various examples, the encoder 142 may be a neural network (e.g., a feed forward network (FFN)) which may be either pre-trained and/or which may be trained end-to-end with the sequential model 134 and/or with the task models 144.

In addition to the encoded task features 140 that are specific to the automation opportunity the task model 144 that is specific to the automation opportunity may receive the current hidden state embedding 136 from sequential model 134. In various examples, the relevant task model 144 may extract the DSE(s) from the hidden state embedding 136 that are relevant to the automation opportunity (e.g., the DSE for the specific devices associated with the automation opportunity). The DSE(s) and the HSE from the hidden state embedding 136 may be input into the specific task model 144 along with the encoded task features 140. The implementation of the various task models 144 is specific to the particular automation opportunity. The various task models 144 may be trained together with the sequential model 134 so that the task models 144 are able to use the hidden state embedding 136 during inference. The task models 144 may output actions (e.g., action 146) that may include automatically controlling one or more of the network-connected devices 120 (e.g., automatically locking the door when the alarm is armed), and/or may include outputting prompts to the user (e.g., "Rain is forecasted to begin in 30 minutes. Would you like to close your living room window?" or "The light is on in the kitchen. Would you like for me to turn it off?"). The output action 146 is similarly dependent on the particular automation opportunity and on the task model 144 implementation. Generally, the task models 144 are able to extract current home state data from the hidden state embedding 136 instead of requiring the network-connected devices 120 (or a centralized hub device) to store and/or provide historical state data and instead of storing the raw data—which could cause privacy issues.

Figure 2:
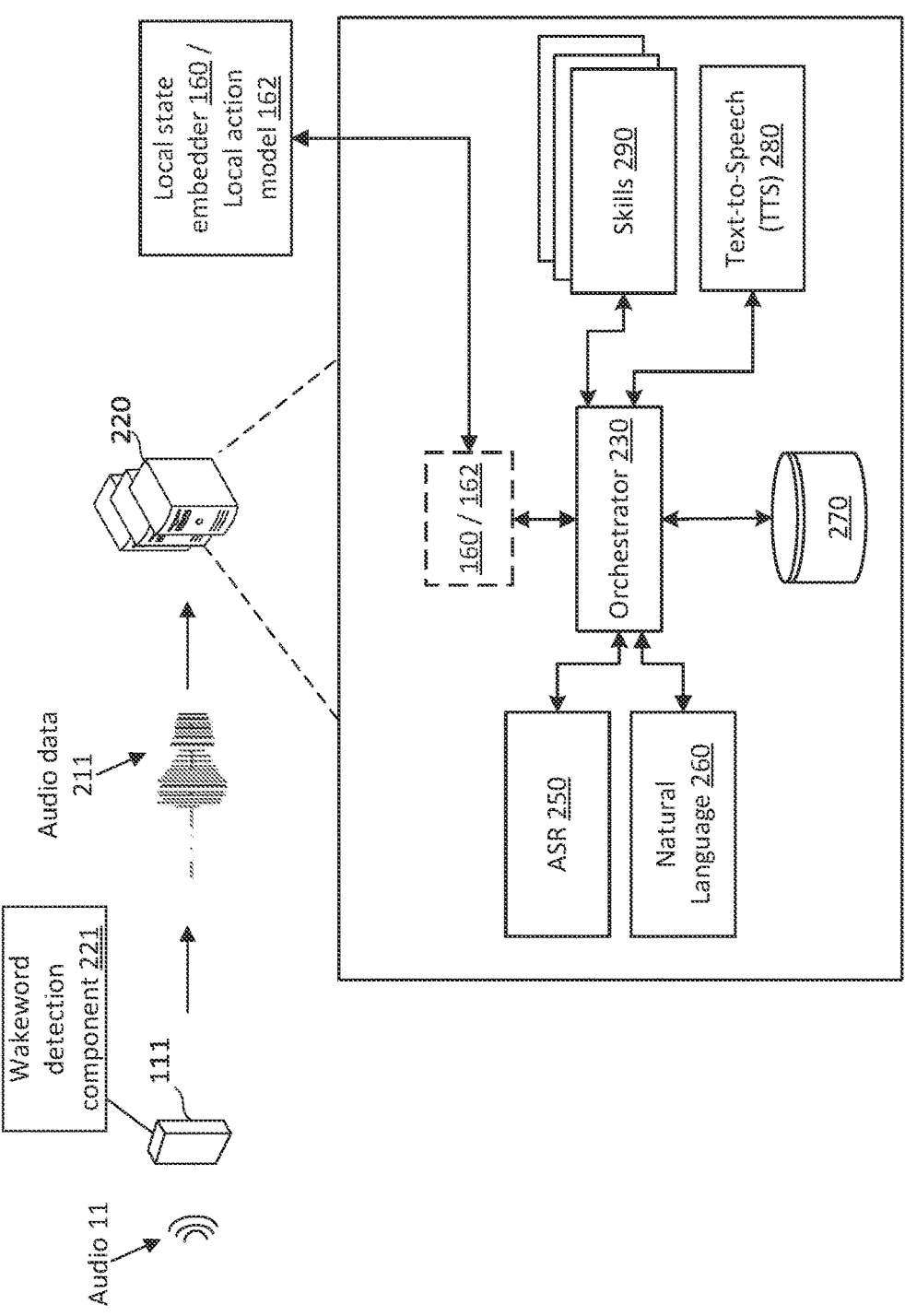
FIG. 2 is a block diagram of various components of a natural language processing system that may be used in accordance with various aspects of the present disclosure.

FIG. 2 is a block diagram of various components of a natural language processing system 220 that may be used in accordance with various aspects of the present disclosure. Although not necessarily limited to such, the system may operate using various natural language processing components as described in FIG. 2. The various components may be located on same or different physical devices. Communication between various components may occur directly or across a network(s). For example, ASR output data (e.g., text data representing a current utterance) output by ASR component 250 may be used to determine an intent of the utterance by natural language component 260. Thereafter, orchestrator 230 may route the intent to one or more skills 290 effective to process the intent (as well as slot data included in the utterance) to perform an action. In some cases, the action may include output of synthesized speech using the TTS component 280.

An audio capture component(s), such as a microphone or array of microphones of the device 111 (e.g., a network-connected device 120 that is enabled with natural language processing capability), captures audio 11. The device 111 processes audio data, representing the audio 11, to determine whether speech is detected. The device 111 may use various techniques to determine whether audio data includes speech. Some embodiments may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-tonoise ratios of the audio data in one or more spectral bands; or other quantitative aspects. In other examples, the device 111 may implement a limited classifier configured to distinguish speech from background noise. The classifier may be implemented by techniques such as linear classifiers, support vector machines, and decision trees. In still other examples, Hidden Markov Model (HMM) or Gaussian Mixture Model (GMM) techniques may be applied to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 111 may use a wakeword detection component 221 to perform wakeword detection to determine when a user intends to speak an input to the device 111. This process may also be referred to as keyword detection, with a wakeword being a specific example of a keyword. An example wakeword is "Alexa," "Computer," etc.

Wakeword detection is typically performed without performing linguistic analysis, textual analysis, or semantic analysis. Instead, the audio data representing the audio 11 may be analyzed to determine if specific characteristics of the audio data match preconfigured acoustic waveforms, audio signatures, or other data to determine if the audio data "matches" stored audio data corresponding to a wakeword. The stored audio data may be provided by the natural language processing system 220 and/or may be provided by the user.

The wakeword detection component 221 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword spotting builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 221 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 111 may wake and begin sending audio data 211, representing the audio 11, to the natural language processing system 220. The audio data 211 may include data corresponding to the wakeword, or the portion of the audio data 211 corresponding to the wakeword may be removed by the device 111 prior to sending the audio data 211 to the natural language processing system 220.

Upon receipt by the natural language processing system 220, the audio data 211 may be sent to an orchestrator component 230. The orchestrator component 230 may include memory and logic that enable the orchestrator component 230 to transmit various pieces and forms of data to various components of the system, as well as perform other operations. The orchestrator component 230 sends the audio data 211 to an ASR component 250. The ASR component 250 transcribes the audio data 211 into text data. The text data output by the ASR component 250 represents one or more than one (e.g., in the form of an N-best list) hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 sends the text data generated thereby to an NLU component 260, for example via the orchestrator component 230. The text data sent from the ASR component 250 to the NLU component 260 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The NLU component 260 attempts to make a semantic interpretation of the phrases or statements represented in the text data input therein. That is, the NLU component 260 determines one or more meanings associated with the phrases or statements represented in the text data based on words represented in the text data. The NLU component 260 determines an intent (e.g., intent data) representing an action that a user desires be performed as well as pieces of the input text data that allow a device (e.g., the device 111, the natural language processing system 220, etc.) to execute the intent. For example, if the text data corresponds to "call John," the NLU component 260 may determine an intent that the system establish a two-way communication channel between the device 111 originating the call and a device of the recipient "John" (a named entity in the utterance). For further example, if the text data corresponds to "tell John I am on my way," the NLU component 260 may determine an intent that the system send a message to a device of the recipient "John," with the message corresponding to "I am on my way."

As described herein, in various examples, local state embedder 160 may receive one or more intents, ASR output data, and/or other natural language data generated by the natural language processing system 220 during a dialog session and may use such data to update the hidden state embedding 136. This provides a representation of recent and past dialogs that is encoded in the hidden state embedding 136 and may be used to provide context when determining whether to perform a particular action. Additionally, the local action model 162 may receive one or more intents, ASR output data, and/or other natural language data generated by the natural language processing system 220 as encoded task features 140 and may use such data as an input to a task model 144 to determine whether or not an automation opportunity should result in a particular output action 146. Further, as previously described, in some examples, some utterances may be used as a continuous trigger 122 to trigger an update of the hidden state embedding 136. Similarly, as previously described, some utterances may be used as a trigger 138 for a specific automation opportunity. In various examples, the orchestrator 230 may communicate with the local state embedder 160 and/or the local action model 162. Additionally, as shown in FIG. 2, the local state embedder 160 and/or the local action model 162 may be deployed on the same device(s) as the natural language processing system 220 and/or may be deployed on one or more different devices within a smart home (or other premises).

The NLU component 260 outputs NLU results to the orchestrator component 230. The NLU results may include an NLU hypothesis, including a representation of an intent and corresponding slotted data that may be used by a downstream component to perform the intent. Alternatively, the NLU results data may include multiple NLU hypotheses, with each NLU hypothesis representing an intent and corresponding slotted data. Each NLU hypothesis may be associated with a confidence value representing a confidence of the NLU component 260 in the processing performed to generate the NLU hypothesis associated with the confidence value.

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the natural language processing system 220 that is akin to a software application running on a traditional computing device. That is, a skill component 290 may enable the natural language processing system 220 to execute specific functionality in order to perform one or more actions (e.g., provide information to a user, display content to a user, output music, or perform some other requested action). The natural language processing system 220 may be configured with more than one skill component 290. For example, a weather skill component may enable the natural language processing system 220 to provide weather information, a ride sharing skill component may enable the natural language processing system 220 to schedule a trip with respect to a ride sharing service, a restaurant skill component may enable the natural language processing system 220 to order food with respect to a restaurant's online ordering system, a communications skill component may enable the system to perform messaging or multi-endpoint communications, etc. A skill component 290 may operate in conjunction between the natural language processing system 220 and other devices such as the device 111 or a gateway system in order to complete certain functions. Inputs to a skill component 290 may come from various interactions and input sources. A skill component may include a communications skill 290a which may correspond to a service for performing media processing that may be operated, for example, by a media processing unit (MPU) as discussed below. In at least some examples, skills 290 may execute one or more of the task models 144 described above that are specific to different automation opportunities.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the natural language processing system 220 (as illustrated in FIG. 2) or may be located at whole (or in part) with one or more separate systems. Unless expressly stated otherwise, reference to a skill, skill device, or skill component may include a skill component operating within the natural language processing system 220 (for example as skill component 290) and/or skill component operating within a system separate from the natural language processing system 220.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the natural language processing system 220, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. A skill may also be associated with media operations that may be performed by an MPU. This allows a skill develop to offer media processing features an independent services that may be invoked by a user. For example, a user may say "Alexa, call mom using CatFace" which may result in the system processing the command to initiate a device-to-device video call between the user's device and a device belonging to the user's mother, while routing the video call through an MPU associated with the "CatFace" skill, which may perform media operations such as recognizing a human face and replacing it with a cat face. As can be appreciated, many different media processing skills may be implemented.

The natural language processing system 220 may include a TTS component 280 that generates audio data (e.g., synthesized speech) from text data using one or more different methods. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The natural language processing system 220 may include profile storage 270 and/or the gateway system may include its own profile storage. The profile storage 270 may include a variety of information related to individual users, groups of users, etc. that interact with the system. The profile storage 270 may include one or more user profiles, with each user profile being associated with a different user identifier. Each user profile may include various user identifying information. Each user profile may also include preferences of the user. Each user profile may also include one or more device identifiers, representing one or more devices of the user.

The profile storage 270 may include one or more group profiles. Each group profile may be associated with a different group identifier. A group profile may be specific to a group of users and/or a group of devices. That is, a group profile may be associated with two or more individual user profiles and/or device profiles. For example, a group profile may be a household profile that is associated with user profiles and/or device profiles associated with multiple users of a single household. A group profile may include preferences shared by all the user profiles and/or device profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. Although depicted in FIG. 2 as a separate component, natural language processing system 220 may be executed wholly or partially by device 111.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and objects in which the component(s) of the system(s) and/or user are located. Permissions may be obtained from a user associated with the device 111, or other devices discussed herein.

Figure 3:
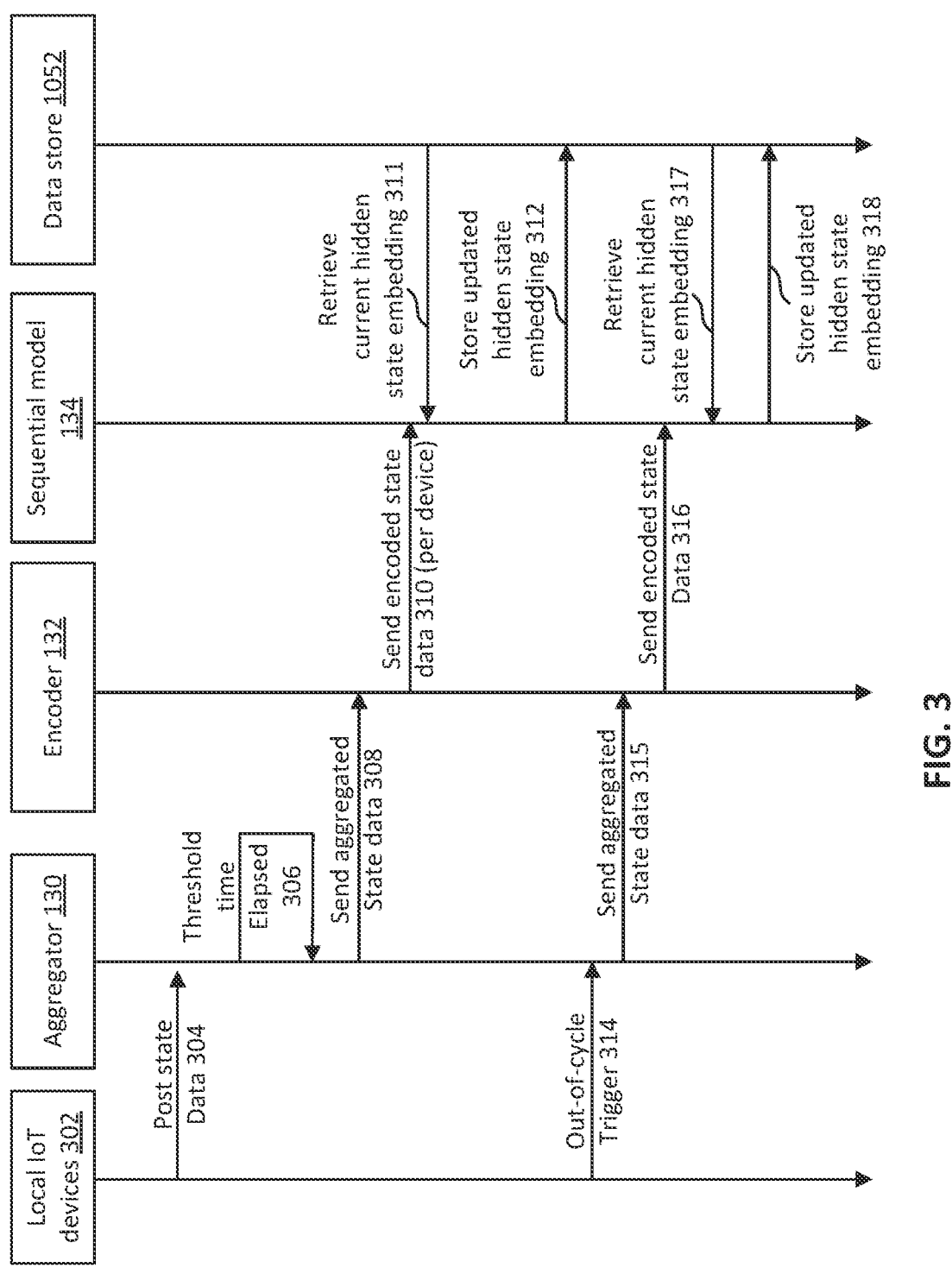
FIG. 3 is a sequence diagram illustrating generating hidden state embeddings for network-connected devices, in accordance with various embodiments described herein.

FIG. 3 is a sequence diagram illustrating generating state embeddings for network-connected devices, in accordance with various embodiments described herein. In various examples, the actions of FIG. 3 illustrate the timing of different actions that occur when generating an updated hidden state embedding 312.

Initially, local IoT devices 302 (e.g., the network-connected devices 120 of FIG. 1) post state data 304 to aggregator 130. As previously described, the state data 304 includes not only current state information, but also state change information, and any other data specific to the various local IoT devices 302. Additionally, various other contextual data may be received from various sources. Examples of such contextual data may include weather information, time of day information, geofence information, user presence information, etc. Aggregator 130 continuously receives the state data 304 (and contextual data) and stores the state data 304 (and contextual data) in memory as it is received. In various examples, each device may send structured data that is of a device specific format. Aggregator 130 may be configured to aggregate the data by combining the data (e.g., through concatenation or other known techniques).

After a threshold amount of time has elapsed (at action 306), aggregator 130 may send the aggregated state data 308 that is stored in memory to the encoder 132. The threshold amount of time may be defined by the continuous trigger 122 logic. As previously described, the aggregated state data 308 may include a combination of different structured data received from different local IoT devices 302 as well as other contextual data. The encoder 132 may be a neural network (e.g., a FFN) trained to take such combined structured data as input and to generate a numeric representation as output (e.g., a vector, tensor, feature map, etc.). The numeric representation output by the encoder 132 is described as encoded state data 310 in FIG. 3. The encoded state data 310 also includes a representation of which state data corresponds to which local IoT devices 302 in order to allow the sequential model 134 to generate the device specific embeddings (DSEs). The encoder 132 sends the encoded state data 310 (per device) to the sequential model 134. sequential model 134 combines the input encoded state data 310 with the current hidden state embedding 311 retrieved from data store 1052 to generate the updated hidden state embedding 312. The updated hidden state embedding 312 includes both the HSE and the DSEs (and potentially unit-specific embeddings) and may be stored in data store 1052 and may thereafter be retrieved and used for prediction as described herein.

In addition to the continuous trigger example described above, an out-of-cycle trigger 314 (e.g., triggering an out-of-cycle update of the hidden state embedding) is also depicted in FIG. 3. An out-of-cycle trigger 314 is a predefined event that causes one or more local IoT devices 302 to send device state data and/or contextual data to aggregator 130. In an out-of-cycle trigger example, aggregator 130 does not wait for the expiration of the threshold time, but instead immediately aggregates the data received from the local IoT device(s) 302 and sends the aggregated state data (and any contextual data) to encoder 132 at action 315. The encoder 132 encodes the received data, as previously described, and sends the encoded state data 316 to the sequential model 134. The sequential model 134 combines the input encoded state data 316 with the current hidden state embedding 317 retrieved from data store 1052 to generate the updated hidden state embedding 318. The updated hidden state embedding 318 includes both the HSE and the DSEs (and potentially unit-specific embeddings) and may be stored in data store 1052 and may thereafter be retrieved and used for prediction as described herein. The updated hidden state embedding 318 represents the out-of-cycle triggering event along with the current and historic state of the local IoT devices 302.

Figure 4:
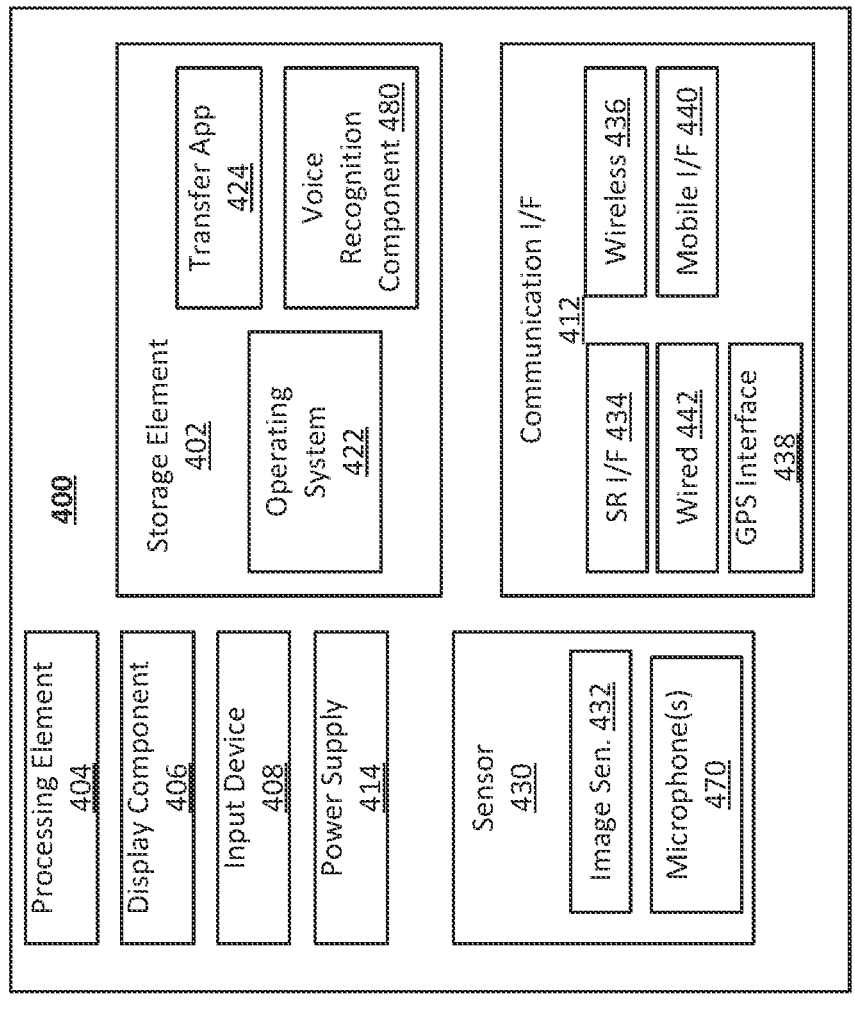
FIG. 4 is a block diagram showing an example architecture of a network-connected device that may be used in accordance with various embodiments described herein.

FIG. 4 is a block diagram showing an example architecture 400 of a network-connected device (e.g., a local IoT device) that may be used to implement, at least in part, a speech processing-enable device configured to receive spoken and/or other natural input commands, in accordance with various aspects of the present disclosure. It will be appreciated that not all devices will include all of the components of the architecture 400 and some user devices may include additional components not shown in the architecture 400. The architecture 400 may include one or more processing elements 404 for executing instructions and retrieving data stored in a storage element 402. The processing element 404 may comprise at least one processor. Any suitable processor or processors may be used. For example, the processing element 404 may comprise one or more digital signal processors (DSPs). In some examples, the processing element 404 may be effective to determine a wakeword and/or to stream audio data to a speech processing system. The storage element 402 can include one or more different types of memory, data storage, or computer-readable storage media devoted to different purposes within the architecture 400. For example, the storage element 402 may comprise flash memory, random-access memory, disk-based storage, etc. Different portions of the storage element 402, for example, may be used for program instructions for execution by the processing element 404, storage of images or other digital works, and/or a removable storage for transferring data to other devices, etc. In various examples, the storage element 402 may comprise the local state embedder 160 and/or the local action model 162 (or a portion thereof).

The storage element 402 may also store software for execution by the processing element 404. An operating system 422 may provide the user with an interface for operating the computing device and may facilitate communications and commands between applications executing on the architecture 400 and various hardware thereof. A transfer application 424 may be configured to receive images, audio, and/or video from another device (e.g., a mobile device, image capture device, and/or display device) or from an image sensor 432 and/or microphone 470 included in the architecture 400. In some examples, the transfer application 424 may also be configured to send the received voice requests to one or more voice recognition servers.

When implemented in some user devices, the architecture 400 may also comprise a display component 406. The display component 406 may comprise one or more light-emitting diodes (LEDs) or other suitable display lamps. Also, in some examples, the display component 406 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 406 may be effective to display content determined provided by a skill executed by the processing element 404 and/or by another computing device.

The architecture 400 may also include one or more input devices 408 operable to receive inputs from a user. The input devices 408 can include, for example, a push button, touch pad, touch screen, wheel, joystick, keyboard, mouse, track-ball, keypad, light gun, game controller, or any other such device or element whereby a user can provide inputs to the architecture 400. These input devices 408 may be incorporated into the architecture 400 or operably coupled to the architecture 400 via wired or wireless interface. In some examples, architecture 400 may include a microphone 470 or an array of microphones for capturing sounds, such as voice requests. Voice recognition component 480 may interpret audio signals of sound captured by microphone 470. In some examples, voice recognition component 480 may listen for a "wakeword" to be received by microphone 470. Upon receipt of the wakeword, voice recognition component 480 may stream audio to a voice recognition server for analysis, such as a speech processing system. In various examples, voice recognition component 480 may stream audio to external computing devices via communication interface 412.

When the display component 406 includes a touch-sensitive display, the input devices 408 can include a touch sensor that operates in conjunction with the display component 406 to permit users to interact with the image displayed by the display component 406 using touch inputs (e.g., with a finger or stylus). The architecture 400 may also include a power supply 414, such as a wired alternating current (AC) converter, a rechargeable battery operable to be recharged through conventional plug-in approaches, or through other approaches such as capacitive or inductive charging.

The communication interface 412 may comprise one or more wired or wireless components operable to communicate with one or more other computing devices. For example, the communication interface 412 may comprise a wireless communication module 436 configured to communicate on a network, such as a computer communication network, according to any suitable wireless protocol, such as IEEE 802.11 or another suitable wireless local area network (WLAN) protocol. A short range interface 434 may be configured to communicate using one or more short range wireless protocols such as, for example, near field communications (NFC), Bluetooth, Bluetooth LE, etc. A mobile interface 440 may be configured to communicate utilizing a cellular or other mobile protocol. A Global Positioning System (GPS) interface 438 may be in communication with one or more earth-orbiting satellites or other suitable position-determining systems to identify a position of the architecture 400. A wired communication module 442 may be configured to communicate according to the USB protocol or any other suitable protocol.

The architecture 400 may also include one or more sensors 430 such as, for example, one or more position sensors, image sensors, and/or motion sensors. An image sensor 432 is shown in FIG. 4. An example of an image sensor 432 may be a camera configured to capture color information, image geometry information, and/or ambient light information.

Figure 5:
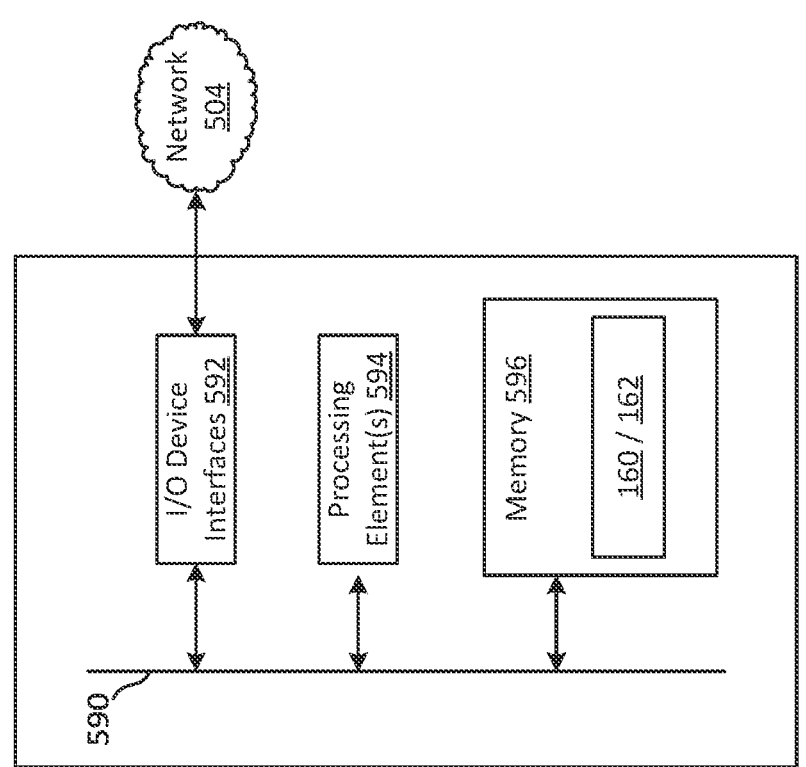
FIG. 5 is a block diagram showing an example architecture of a computing device that may be used in accordance with various embodiments described herein.

FIG. 5 is a block diagram conceptually illustrating example components of a remote device, such as a computing device executing a particular skill, a computing device executing one or more components of a speech processing system (e.g., ASR processing components, NLU processing components, applicable protocol recognition, etc.) and/or command processing. Multiple computing devices may be included in the system, such as one speech processing computing device for performing ASR processing, one speech processing computing device for performing NLU processing, one or more skill computing device(s) implementing skills, etc. In operation, each of these devices (or groups of devices) may include non-transitory computer-readable and computer-executable instructions that reside on the respective device, as will be discussed further below. The remote device of FIG. 5 may communicate with one or more other devices over a network 504 (e.g., a wide area network or local area network).

Each computing device of a speech processing system may include one or more controllers/processors 594, which may each include at least one central processing unit (CPU) for processing data and computer-readable instructions, and a memory 596 for storing data and instructions of the respective device. In at least some examples, memory 596 may store, for example, a list of N-best intents data that may be generated for particular request data. In some examples, memory 596 may store machine learning models of the NLU component 260, such as machine learned models associated with various NLU process flows (described in reference to FIG. 1), when loaded from memory 596. In various further examples, memory 596 may be effective to store instructions effective to program controllers/processors 594 to perform the various techniques described above in reference to FIGS. 1-3. Accordingly, in FIG. 5, local state embedder 160 and local action model 162 are depicted as being stored within memory 596, as an example. The memories 596 may individually include volatile random access memory (RAM), non-volatile read only memory (ROM), non-volatile magnetoresistive memory (MRAM), and/or other types of memory. Each computing device of a speech processing system (and/or a component thereof) may also include memory 596 for storing data and controller/processor-executable instructions. Each memory 596 may individually include one or more non-volatile storage types such as magnetic storage, optical storage, solid-state storage, etc. Each computing device of a speech processing system may also be connected to removable or external non-volatile memory and/or storage (such as a removable memory card, memory key drive, networked storage, etc.) through respective input/output device interfaces 592. In various examples, the feature data and/or training data used by the various machine learning models (such as sequential model 134) may be stored and/or cached in memory 596.

Computer instructions for operating each computing device of natural language processing system 220 may be executed by the respective device's controllers/processors 594, using the memory 596 as temporary "working" storage at runtime. A device's computer instructions may be stored in a non-transitory manner in non-volatile memory 596 (e.g., a non-transitory computer-readable memory), memory 596, or an external device(s). Alternatively, some or all of the executable instructions may be embedded in hardware or firmware on the respective device in addition to or instead of software.

Each computing device of speech processing system 100 includes input/output device interfaces 592. A variety of components may be connected through the input/output device interfaces 592, as will be discussed further below. Additionally, each computing device of a speech processing system may include an address/data bus 590 for conveying data among components of the respective device. Each component within a computing device of a speech processing system may also be directly connected to other components in addition to (or instead of) being connected to other components across the bus 590.

As noted above, multiple devices may be employed in a single system. In such a multi-device system, each of the devices may include different components for performing different aspects of the system's processing. The multiple devices may include overlapping components. The components of a speech processing system, as described herein, are exemplary, and may be located as a stand-alone device or may be included, in whole or in part, as a component of a larger device or system.

FIG. 6 depicts a flow chart showing an example process 600 for determining an action to be performed based on state embedding data for network-connected devices, in accordance with various aspects of the present disclosure. Those portions of FIG. 6 that have been previously discussed in reference to FIGS. 1-5 may not be described again for purposes of clarity and brevity. The actions of the process 600 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 600 may begin at action 610, at which first data that represents states of network-connected devices configured in communication with a first network may be determined. For example, local IoT devices may be configured in communication with a LAN and may continuously send state data describing current states of the IoT devices to the local state embedder 160.

Processing may continue at action 612, at which a sequential model (e.g., an RNN such as an LSTM) may generate first embedding data representing a combination of the first data and historical state data for the network-connected devices. For example, the state data (and/or contextual data) received from the local IoT devices at action 610 may be combined with a current hidden state embedding of sequential model 134 to generate an updated hidden state embedding reflecting the more recent state data determined at action 610. Processing may continue to action 614, at which the first embedding data (e.g., hidden state embedding 136) may be stored in memory for subsequent use (e.g., by a task model 144).

Processing may continue to action 616, at which a determination may be made that an event trigger has occurred. As previously described, the event trigger may be associated with a particular automation opportunity. For example, a geofence may have been crossed due to a user leaving their home (e.g., as determined using GPS coordinates of the user's smart phone). An automation opportunity may arise wherein the user may not have locked a door or turned off a smart light when leaving their home. This may prompt evaluation of the automation opportunity as described in further detail below.

Processing may continue to action 618, at which feature data related to the event trigger may be generated. In the above example, feature data related to the unlocked door (e.g., the smart lock) and/or the smart light having the ON state may be determined as well as feature data relating to the time of day, presence of other individuals within the home, etc. In this example, these may be the features included in the set of feature data for the particular automation opportunity (and the relevant event trigger).

Processing may continue to action 620, where the first embedding data may be retrieved from the memory. The first embedding data comprises the HSE and the relevant DSEs of the hidden state embedding 136 that describe historical device usage and/or recent state change data along with contextual data.

Processing may continue at action 622, at which a machine learning model (e.g., a task model 144) may determine an action to take (or whether to take an action) in response to the event trigger using the first embedding data and the task-specific feature data generated at action 618. At action 622, the HSE, the DSE (for the relevant devices), and the task-specific feature data may be provided as inputs to the task model. In the foregoing example, the task model 144 may determine that the user typically leaves the light on when she leaves the house at this time of day, but that she typically locks the door. Accordingly, the task model 144 may determine an action that comprises prompting the user to inquire whether the user would like for the door to be unlocked, but which does not comprise prompting the user about the light that was left on.

Processing may proceed to action 624, at which the action may be performed by at least one of the network-connected devices. As previously mentioned, the specific action depends on the event trigger/automation opportunity, the task model 144, the task-specific feature data, and the hidden state embedding 136 (including the HSE and the relevant DSEs).

Figure 7:
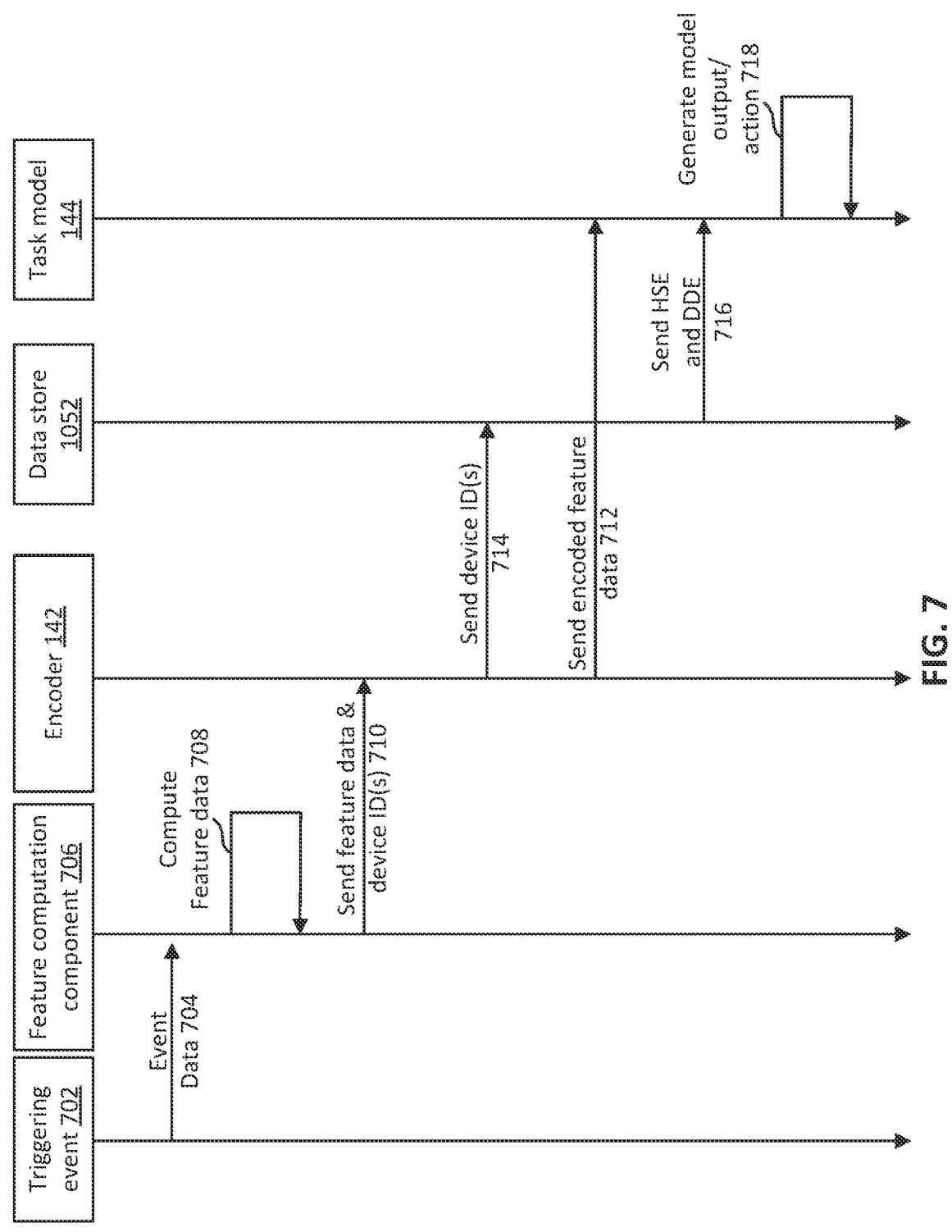
FIG. 7 is a sequence diagram illustrating determining an action based on state embedding data for network configured devices, according to embodiments of the present disclosure.

FIG. 7 is a sequence diagram illustrating determining an action based on state embedding data for network configured devices, according to embodiments of the present disclosure. FIG. 7 describes a sequence of actions that may be used by the local action model 162 to determine an action to take in response to a particular event trigger, in accordance with various aspects of the present disclosure. In various examples, a triggering event 702 may occur. The triggering event 702 may be associated with expiration of a timer (e.g., a continuously cycling timer used to periodically check for automation opportunities), a predefined utterance, a specific action (e.g., arming an alarm panel), etc. Event data 704 describing the triggering event 702 may be sent to feature computation component 706.

The feature computation component 706 may determine relevant features (e.g., feature definitions) for the specific automation opportunity. For example, device state of devices implicated by the triggering event 702 (and/or the automation opportunity) and/or contextual data (e.g., time of day, weather, etc.) may be determined and feature data 708 may be computed for the task-specific features by feature computation component 706.

The task-specific feature data and/or the relevant device IDs (e.g., device identifiers indicating the relevant devices) may be sent to the encoder 142 (action 710). The encoder 142 may be a neural network (e.g., a FFN) trained to take the feature data as input and to generate a numeric representation as output (e.g., a vector, tensor, feature map, etc.). The numeric representation output by the encoder 142 is described as encoded feature data 712 in FIG. 7. The encoded feature data 712 may be sent to the task model 144 that is specific to the automation opportunity (and/or to the triggering event 702).

In addition, the device ID(s) 714 of the relevant devices (e.g., those devices that may be implicated by the automation opportunity) may also be sent to the data store 1052 in order to allow the appropriate device-specific embeddings (DSEs) to be looked up for these devices. In the example of FIG. 7, the HSE and the DSEs for the specific devices may be sent from the data store 1052 at action 716 to the task model 144 that is specific to the automation opportunity (and/or to the triggering event 702).

The task model 144 that is specific to the automation opportunity (and/or to the triggering event 702) may receive the HSE and the relevant DSEs of the hidden state embedding 136 as input along with the encoded feature data 712 and may determine an output such as one or more of a determination of whether an action should be performed, what action should be performed, whether a prompt should be generated, etc. As previously described, the particular action and/or output generated at action 718 is dependent on the particular triggering event 702, automation opportunity, and the task-specific model (e.g., the specific task model 144). Accordingly, the output is highly implementation specific.

Figure 8:
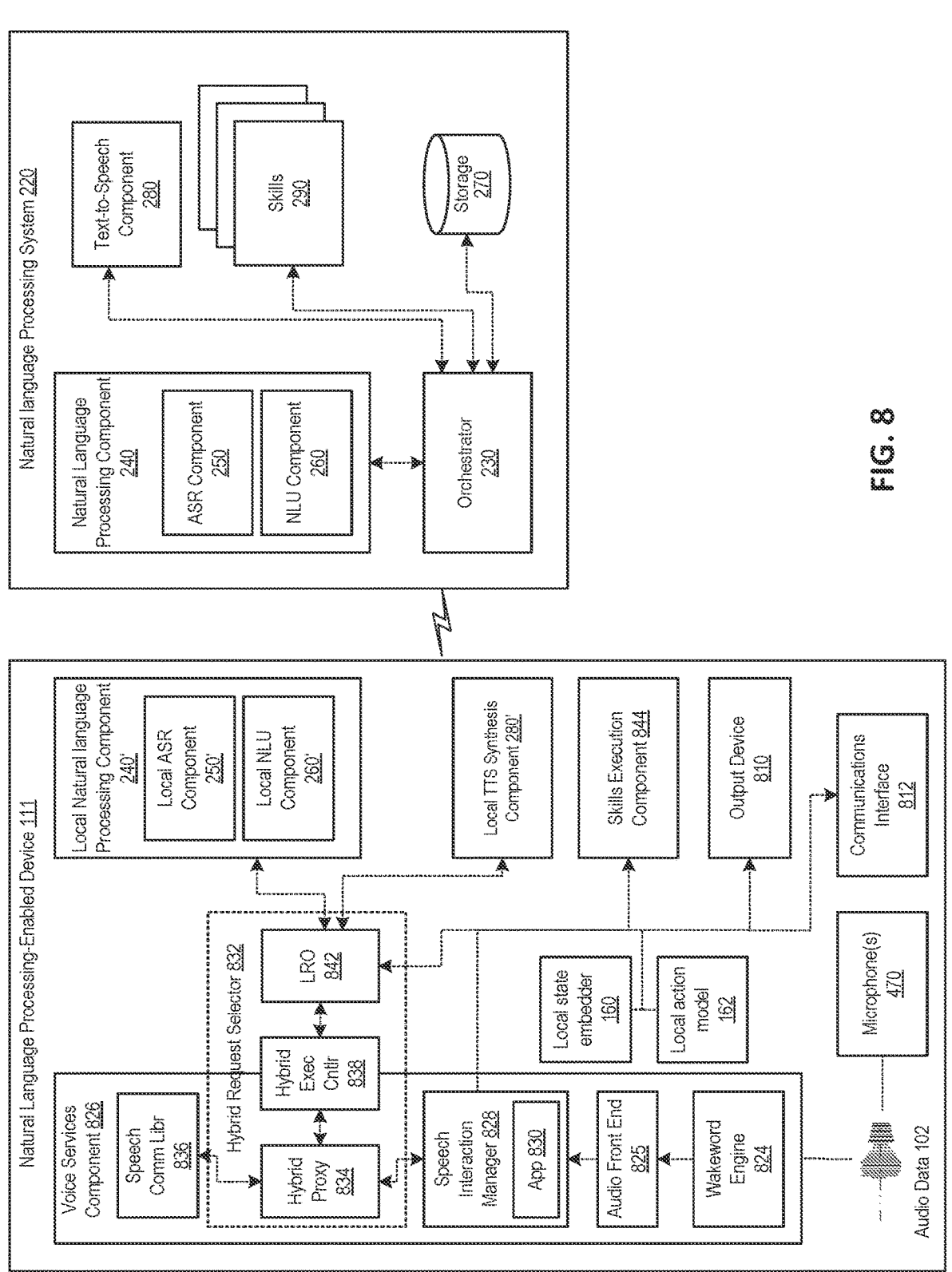
FIG. 8 is a block diagram illustrating a natural language processing-enabled device and a natural language processing management system, in accordance with embodiments of the present disclosure.

FIG. 8 is a block diagram illustrating a device 111 (e.g., a natural language processing enabled device) and a natural language processing system 220, in accordance with embodiments of the present disclosure. In various examples, device 111 may be a natural language processing-enabled device and may include microphones (e.g., far-field microphone arrays) used to transform audio into electrical signals. The device 111 may be among the IoT devices described herein that are local to (e.g., communicating on the same LAN) the network-connected devices 120. Natural language processing may then be performed, either locally by the natural language processing components of device 111, by one or more other computing devices communicating with the device 111 over a network (e.g., natural language processing system 220), or by some combination of the device 111 and the one or more other computing devices. In various examples, device 111 may include and/or may be configured in communication with output device(s) 810 (e.g., speakers, displays, and/or other IoT devices among network-connected devices 120) effective to output information obtained in response to a user's spoken request or command, or to output content that may be of interest to one or more users.

As used herein, a display of the device 111 refers to a display effective to output graphics such as images and/or video. Further, as used herein, a displayless device refers to a device that does not include a display that is effective to render graphical images or text.

In various examples, the device 111 may include the local state embedder 160 and/or the local action model 162 that may be used to generate and continuously update a hidden state embedding representing state data and/or historical usage data for IoT devices that are on premises (e.g., within the home). The local action model 162 may use such hidden state embedding data (including device specific embeddings) to determine automation opportunities and/or to perform automated actions, as described herein. Further, the local state embedder 160 may store data representing dialog sessions that are processed by the device 111 in order to represent such information in both the HSE and the DSE of the hidden state embedding. Similarly, the local action model 162 may use certain utterances processed by the device 111 to trigger various task-specific models and/or automation opportunities, as described herein.

A natural language processing-enabled computing system may respond to user utterances by outputting content and/or performing one or more other actions, such as playing music, providing information, calling a taxi, displaying an image, etc. Generally, input data received by the various natural language processing systems and components described herein may comprise natural language input data. Natural language input data may be in the form of audio data representing spoken user utterances (e.g., a spoken user request), text data (e.g., a request typed by a user), gesture data (e.g., data representing a user shaking their head while wearing ear buds, making a hand gesture, etc.), and/or some combination of text data, gesture data, and/or audio data.

Speech-processing systems may be configured with multiple applications (e.g., thousands, tens of thousands, or more applications) that can be used to potentially respond to a user request. Applications may be referred to herein as "skills." Natural language processing systems may be effective to process spoken and/or textual natural language inputs to determine data representing a semantic understanding of the inputs. Skills may include any application effective to communicate with a natural language processing system in order to take one or more actions based on inputs from the natural language processing system. For example, a speech-processing system may include music skills, video skills, calendar skills, timer skills, general knowledge answering skills, game skills, device control skills, etc. As described herein, skills receive NLU data comprising slot data and/or intent data and are configured to determine one or more actions based on the slot data and/or intent data. Examples of such actions may include text to be processed into output audio data (e.g., synthetic speech) via a text-to-speech (TTS) component, an executable command effective to play a song from a music service, a movie from a movie service, or the like, an executable command effective to cause a system to perform an action (e.g., turning lights on/off, controlling an appliance, purchasing an item, etc.).

The invocation of a skill by a user's utterance may include a request that an action be taken. The number of applications/skills continues to grow and the rate of growth is increasing as developers become more accustomed to application programming interfaces (APIs) and application development kits provided for the voice user interface system. Rule-based approaches and/or predefined utterance matching may be used in some systems for processing requests spoken in a certain format to invoke a particular application. In at least some examples, a "skill," "skill component," "skill," "natural language processing skill," and the like may be software running on a computing device, similar to a traditional software application running on a computing device. Such skills may include a voice user interface in addition to or instead of, in at least some instances, a graphical user interface, smart home device interface, and/or other type of interface.

In addition to using the microphone(s) 470 to capture utterances and convert them into digital audio data 102, the device 111 may additionally, or alternatively, receive audio data 102 (e.g., via the communications interface 812) from another device in the environment. In various examples, the device 111 may capture video and/or other image data using a camera. Under normal conditions, the device 111 may operate in conjunction with and/or under the control of a remote, network-based or network-accessible natural language processing system 220. The natural language processing system 220 may, in some instances, be part of a network-accessible computing platform that is maintained and accessible via a wide area network (WAN). Network-accessible computing platforms such as this may be referred to using terms such as "on-demand computing", "software as a service (SaaS)", "platform computing", "network-accessible platform", "cloud services", "data centers", and so forth. The natural language processing system 220 may be configured to provide particular functionality to large numbers of local (e.g., in-home, in-car, etc.) devices of different users. The WAN is representative of any type of public or private, wide area network, such as the Internet, which extends beyond the environment of the device 111. Thus, the WAN may represent and/or include, without limitation, data and/or voice networks, a wired infrastructure (e.g., coaxial cable, fiber optic cable, etc.), a wireless infrastructure (e.g., radio frequencies (RF), cellular, satellite, etc.), and/or other connection technologies.

In some embodiments, the natural language processing system 220 may be configured to receive audio data 102 from the device 111, to recognize speech in the received audio data 102, and to perform functions in response to the recognized speech. In some embodiments, these functions involve sending a command, from the natural language processing system 220, to the device 111 to cause the device 111 to perform an action, such as output an audible response to the user speech via output device 810 (e.g., one or more loudspeakers). Thus, under normal conditions, when the device 111 is able to communicate with the natural language processing system 220 over a WAN (e.g., the Internet), some or all of the functions capable of being performed by the natural language processing system 220 may be performed by sending a command over a WAN to the device 111, which, in turn, may process the command for performing actions. For example, the natural language processing system 220, via a remote command that is included in remote response data, may instruct the device 111 to output an audible response (e.g., using a local text-to-speech (TTS) synthesis component 280) to a user's question, to output content (e.g., music) via output device 810 (e.g., one or more loudspeakers) of the device 111, or to control other devices in the local environment (e.g., the user's home). It is to be appreciated that the natural language processing system 220 may be configured to provide other functions, in addition to those discussed herein, such as, without limitation, providing step-by-step directions for navigating from an origin to a destination location, conducting an electronic commerce transaction on behalf of a user as part of a shopping function, establishing a communication session between the current user and another user, etc.

In order to process voice commands locally, the device 111 may include a local voice services component 826. When a user utterance including the wakeword is captured by the microphone 470 of the device 111, the audio data 102 representing the utterance is received by a wakeword engine 824 of the voice services component 826. The wakeword engine 824 may be configured to compare the audio data 102 to stored models used to detect a wakeword (e.g., "Computer") that indicates to the device 111 that the audio data 102 is to be processed for determining an intent. Thus, the wakeword engine 824 is configured to determine whether a wakeword is detected in the audio data 102, and, if a wakeword is detected, the wakeword engine 824 can proceed with routing the audio data 102 to an audio front end (AFE) 825 (sometimes referred to as an acoustic front end (AFE)) of the voice services component 826. If a wakeword is not detected in the audio data 102, the wakeword engine 824 can refrain from sending the audio data 102 to the AFE 825, thereby preventing the audio data 102 from being further processed. The audio data 102 can be discarded.

The AFE 825 is configured to transform the audio data 102 received from the wakeword engine 824 into data for processing by a suitable ASR component and/or NLU component. The AFE 825 may reduce noise in the audio data 102 and divide the digitized audio data 102 into frames representing a time intervals for which the AFE 825 determines a number of values, called features, representing the qualities of the audio data 102, along with a set of those values, called a feature vector, representing the features/qualities of the audio data 102 within the frame. Many different features may be determined, and each feature represents some quality of the audio data 102 that may be useful for ASR processing and/or NLU processing. A number of approaches may be used by the AFE 825 to process the audio data 102, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. In some embodiments, the AFE 825 is configured to use beamforming data to process the received audio data 102. Beamforming can be used to distinguish between the directions from which speech and noise originate. Accordingly, the microphones 470 may be arranged in a beamforming array to receive multiple audio signals, where multiple audio sources including speech may be identified in different beams and processed. Beamforming may involve processing multiple audio signals (e.g., originating from multiple microphones in a microphone array) together, such as by time shifting one audio signal with respect to another audio signal, to increase the signal and decrease the noise in the audio. Time offsets in the audio data 102, used by the AFE 825 in beamforming, may be determined based on results of the wakeword engine 824's processing of the audio data 102. For example, the wakeword engine 824 may detect the wakeword in the audio data 102 from a first microphone 470 at time, t, while detecting the wakeword in the audio data 102 from a second microphone 470 a millisecond later in time (e.g., time, t+1 millisecond), and so on and so forth, for any suitable number of audio signals corresponding to multiple microphones 470 in a microphone array.

A speech interaction manager (SIM) 828 of the voice services component 826 may receive the audio data 102 that has been processed by the AFE 825. The SIM 828 may manage received audio data 102 by processing request data and non-speech noise or sounds as events, and the SIM 828 may also manage the processing of commands that are used to respond to the user speech or non-speech noise or sounds (e.g., by controlling the action(s) of natural language processing components of device 111). The SIM 828 may include one or more client applications 830 for performing various functions at the device 111.

A hybrid request selector component 832 of the device 111 is shown as including a hybrid proxy component (HP) 834, among other components. The HP 834 can be implemented as a layer within the voice services component 826 that is located between the SIM 828 and a speech communication library (SCL) 836, and may be configured to proxy traffic to/from the natural language processing system 220. For example, the HP 834 may be configured to pass messages between the SIM 828 and the SCL 836 (such as by passing events and instructions there between), and to send messages to/from a hybrid execution controller component (HEC) 838 of the hybrid request selector component 832. For instance, command data received from the natural language processing system 220 can be sent to the HEC 838 using the HP 834, which sits in the path between the SCL 836 and the SIM 828. The HP 834 may also be configured to allow audio data 102 received from the SIM 828 to pass through to the natural language processing system 220 (via the SCL 836) while also receiving (e.g., intercepting) this audio data 102 and sending the received audio data 102 to the HEC 838 (sometimes via an additional SCL).

As will be described in more detail below, the HP 834 and the HEC 838 are configured to perform a handshake procedure to connect to each other. As part of this handshake procedure, the HP 834 and the HEC 838 exchange data including, without limitation, configurations, context, settings, device identifiers (ID), networking protocol versions, time zones, and language data (sometimes referred to herein as "locale data"). Based on at least some of this data (e.g., based at least in part on the language data) exchanged during the handshake procedure, the HEC 838 determines whether to accept or reject the connection request from the HP 834. If the HEC 838 rejects the HP's 834 connection request, the HEC 838 can provide metadata to the HP 834 that provides a reason why the connection request was rejected.

A local natural language processing component 240' (sometimes referred to as a "natural language processing component," a "spoken language understanding (SLU) component," a "speech engine," or an "engine") is configured to process audio data 102 (e.g., audio data 102 representing user speech, audio data 102 representing non-speech noise or sounds, etc.). In some embodiments, the hybrid request selector component 832 may further include a local request orchestrator component (LRO) 842. The LRO 842 is configured to notify the local natural language processing component 240' about the availability of new audio data 102 that represents user speech, and to otherwise initiate the operations of the local natural language processing component 240' when new audio data 102 becomes available. In general, the hybrid request selector component 832 may control the execution of the local natural language processing component 240', such as by sending "execute" and "terminate" events/instructions to the local natural language processing component 240'. An "execute" event may instruct the local natural language processing component 240' to continue any suspended execution based on audio data 102 (e.g., by instructing the local natural language processing component 240' to execute on a previously-determined intent in order to generate a command). Meanwhile, a "terminate" event may instruct the local natural language processing component 240' to terminate further execution based on the audio data 102, such as when the device 111 receives command data from the natural language processing system 220 and chooses to use that remotely-generated command data.

The LRO 842 may interact with a skills execution component 844 that is configured to receive intent data output from the local natural language processing component 240' and to execute a skill based on the intent.

To illustrate how the device 111 can operate at runtime, consider an example where a user utters an expression, such as "Computer, turn off the kitchen lights." The audio data 102 is received by the wakeword engine 824, which detects the wakeword "Computer," and forwards the audio data 102 to the SIM 828 via the AFE 825 as a result of detecting the wakeword. The SIM 828 may send the audio data 102 to the HP 834, and the HP 834 may allow the audio data 102 to pass through to the natural language processing system 220 (e.g., via the SCL 836), and the HP 834 may also input the audio data 102 to the local natural language processing component 240' by routing the audio data 102 through the HEC 838 of the hybrid request selector 832, whereby the LRO 842 notifies the local natural language processing component 240' of the incoming audio data 102. At this point, the hybrid request selector 832 may wait for response data from the natural language processing system 220 and/or the local natural language processing component 240'.

The local natural language processing component 240' is configured to receive the audio data 102 from the hybrid request selector 832 as input, to recognize speech (and/or non-speech audio events) in the audio data 102, to determine an intent (e.g., user intent) from the recognized speech (or non-speech audio event). This intent can be provided to the skills execution component 844 via the LRO 842, and the skills execution component 844 can determine how to act on the intent by generating directive data. In some cases, a directive may include a description of the intent (e.g., an intent to turn off {device A}). In some cases, a directive may include (e.g., encode) an identifier of a second device, such as the kitchen lights, and an operation to be performed at the second device. Directive data that is generated by the skills execution component 844 (and/or the natural language processing system 220) may be formatted using Java, such as JavaScript syntax, or JavaScript-based syntax. This may include formatting the directive using JSON. In some embodiments, a locally-generated directive may be serialized, much like how remotely-generated directives are serialized for transmission in data packets over the network. In other embodiments, a locally-generated directive is formatted as a programmatic API call with a same logical operation as a remotely-generated directive. In other words, a locally-generated directive may mimic remotely-generated directives by using a same, or a similar, format as the remotely-generated directive.

The local natural language processing component 240' may include an automatic speech recognition (ASR) component 250' that is configured to perform ASR processing on the audio data 102 to convert the audio data 102 into text data (sometimes referred to herein as "ASR text data," an "ASR result", or "ASR data"). ASR transcribes audio data 102 into text data representing the words of the user speech contained in the audio data 102. A spoken utterance in the audio data 102 can be input to the local ASR component 250', which then interprets the utterance based on the similarity between the utterance and pre-established language models available to the local natural language processing component 240'. In some embodiments, the local ASR component 250' outputs the most likely text recognized in the audio data 102, or multiple hypotheses in the form of a lattice or an N-best list with individual hypotheses corresponding to confidence scores or other scores (such as probability scores, etc.). In some embodiments, the local ASR component 250' is customized to the user (or multiple users) who created a user account to which the device 111 is registered. For instance, the language models (and other data) used by the local ASR component 250' may be based on known information (e.g., preferences) of the user, and/or on a history of previous interactions with the user.

The local natural language processing component 240' may also include a local NLU component 260' that performs NLU processing on the generated ASR text data to determine intent data and/or slot data (referred to herein as a "NLU result", or "NLU data") so that directives may be determined (e.g., by the skills execution component 844) based on the intent data and/or the slot data. Generally, the local NLU component 260' takes textual input (such as text data generated by the local ASR component 250') and attempts to make a semantic interpretation of the ASR text data.

Natural Language Processing System

In other situations, the device 111 may send the audio data 102 to the natural language processing system 220 for processing. As described above, the device 111 may capture audio using the microphone 470, and send audio data 102 (e.g., representing a spoken user request), corresponding to the captured audio, to the natural language processing system 220. The device 111 may include a wakeword detection component that detects when input audio includes a spoken wakeword, and when the wakeword is detected, the audio data 102 is sent by the device 111 to the natural language processing system 220.

Upon receipt by the natural language processing system 220, the audio data 102 may be sent to an orchestrator component 230. The orchestrator component 230 may include memory and logic that enables the orchestrator component 230 to send various pieces and forms of data to various components of the system.

Similar to the operation described above with respect to the local natural language processing component 240' of the device 111, the orchestrator component 230 may send the audio data 102 to a natural language processing component 240. An ASR component 250 of the natural language processing component 240 transcribes the audio data 102 into one or more hypotheses representing speech contained in the audio data 102. The natural language processing component 240 interprets the speech in the audio data based on a similarity between the characteristics of the audio data corresponding to the speech and pre-established language models. For example, the natural language processing component 240 may compare the audio data 102 with models for sounds (e.g., subword units such as phonemes) and sequences of sounds to identify words that match the sequence of sounds in the speech represented in the audio data 102. The natural language processing component 240 may send text data generated thereby to an NLU component 260 of the natural language processing component 240. The text data output by the natural language processing component 240 may include a top scoring hypothesis of the speech represented in the audio data 102 or may include an N-best list including a group of hypotheses of the speech represented in the audio data 102, and potentially respective scores ASR processing confidence scores.

The NLU component 260 attempts to make a semantic interpretation of the phrases or statements represented in the text data input therein. That is, the NLU component 260 determines one or more meanings associated with the phrases or statements represented in the text data based on individual words represented in the text data. The NLU component 260 interprets a text string to derive an intent of the user (e.g., an action that the user desires be performed) as well as pertinent pieces of information in the text data that allow a device (e.g., the natural language processing system 220) to complete the intent. For example, if the text data corresponds to "Play the new album by [Musical_Artist]", the NLU component 260 may determine the user intended to invoke a music playback intent to play the identified album.

The natural language processing system 220 may include a non-transitory computer-readable memory storage 270, storing various instructions for operation of the natural language processing system 220.

As described above, the natural language processing system 220 may include one or more skill components 290. The natural language processing system 220 may also include a TTS component 280 that synthesizes speech (e.g., generates audio data) corresponding to text data input therein. The TTS component 280 may perform speech synthesis using one or more different methods. In one method of synthesis called unit selection, the TTS component 280 matches text data against one or more databases of recorded speech. Matching units are selected and concatenated together to form audio data. In another method of synthesis called parametric synthesis, the TTS component 280 varies parameters such as frequency, volume, and noise to create an artificial speech waveform output. Parametric synthesis uses a computerized voice generator, sometimes called a vocoder.

The various components of the natural language processing system 220 and the device 111 described herein may be implemented in software, hardware, firmware, or some combination thereof.

The natural language processing system 220 may reside on device 111, in a cloud computing environment, or some combination thereof. For example, the device 111 may include computing equipment, some portion of which is configured with some or all of the components or functionality of natural language processing system 220 and another portion of which is configured with some or all of the components or functionality of computing device(s) used in natural language processing system 220. The device 111 may then perform a variety of functions on its own (such as when remote communications are unavailable), and/or may communicate (when capable) with computing device(s) and/or the natural language processing system 220 to perform other functions. Alternatively, all of the functionality may reside on the device 111 or remotely.

Figure 9:
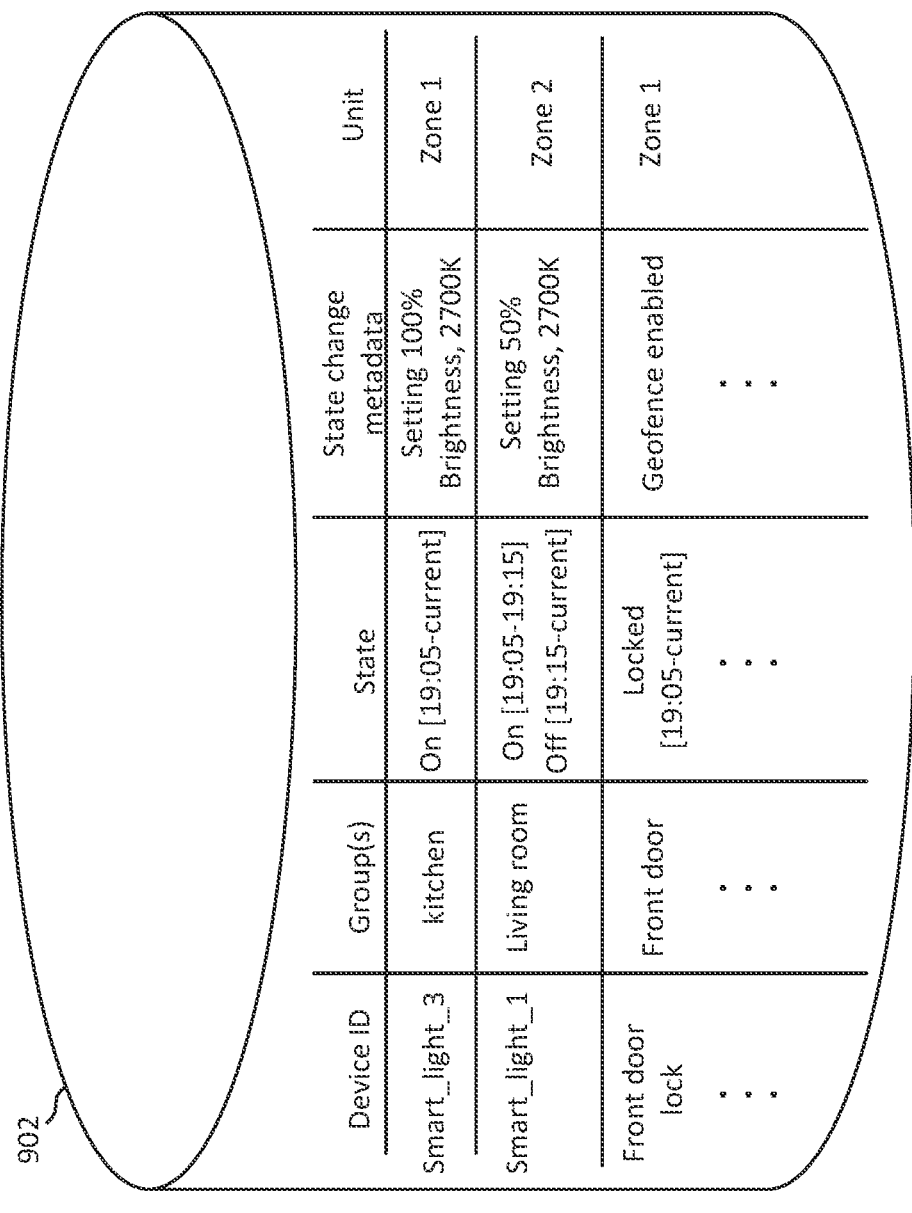
FIG. 9 is a block diagram of a non-transitory computer-readable memory storing network-configured device state data, in accordance with various aspects of the present disclosure.

FIG. 9 is a block diagram of a non-transitory computer-readable memory 902 storing network-configured device state data, in accordance with various aspects of the present disclosure. The various state data, state change metadata, group data, and device ID data is merely an example. Other, different data and/or combinations of data may be used in accordance with the various techniques described herein.

The example data depicted in FIG. 9 is an example of various data that may be represented using a hidden state embedding 136, as described herein. The device ID data may be an example of state data (or contextual data) describing a particular IoT device. This may be used to distinguish the device from among other devices of the same type and/or from among devices of different types. Accordingly, when a task model 144 (FIG. 1) is triggered by a trigger 138, the device-specific embedding (DSE) may be looked up in non-transitory computer-readable memory 902 (e.g., using the device ID data as a query) in order to retrieve the DSE for the implicated device. Additionally, different device types may be associated with different capabilities/functionalities. For example, some devices may include displays, and may therefore be effective to output image content and/or video content. Some other devices may include speakers and may be effective to output audio. Some other devices may have neither displays nor speakers and may therefore be inappropriate for outputting video or audio.

Group(s) data describes grouping of a device (e.g., with other devices) and/or a location of the device at a physical location. For example, the device ID Smart_light_3 is associated with the group "kitchen." This state data may be determined explicitly by user input and/or may be implicitly determined based on other signals (e.g., a display device that is used to constantly request recipe videos may be inferred by a machine learning model to be in a kitchen). The state field may describe a state of the device (e.g., during the last embedding trigger cycle of 15 minutes, or some other amount of time). For example, Smart_light_3 has been in an ON state from the time 19:05 until the current time. Additional state data (e.g., state change metadata) may also be included. For example, Smart_light_3 has been ON with a setting of 100% brightness and a color temperature of 2700K. Smart_light_1 was in an ON state from 19:05-19:15, but was then changed to an OFF state from 19:15 until the current time, etc. In various examples, a unit identifier may also be stored to associate the various state data with a particular unit such as a building, zone, and/or other physical space among those spaces associated with an account. For example, a user may separate the various devices according to floors within a home, rooms, different buildings, etc.

This information may be continuously collected and aggregated locally and may be transformed into a hidden state embedding by a sequential model such as an RNN or other machine learning network, as described herein. As previously described, the hidden state embedding is a compressed representation of home state data—alleviating the need to store large amounts of historical usage data. Additionally, the hidden state embedding preserves user privacy, as the hidden state embedding does not have meaning outside of the particular machine learning architecture that has been trained to generate and use such data.

Figure 10:
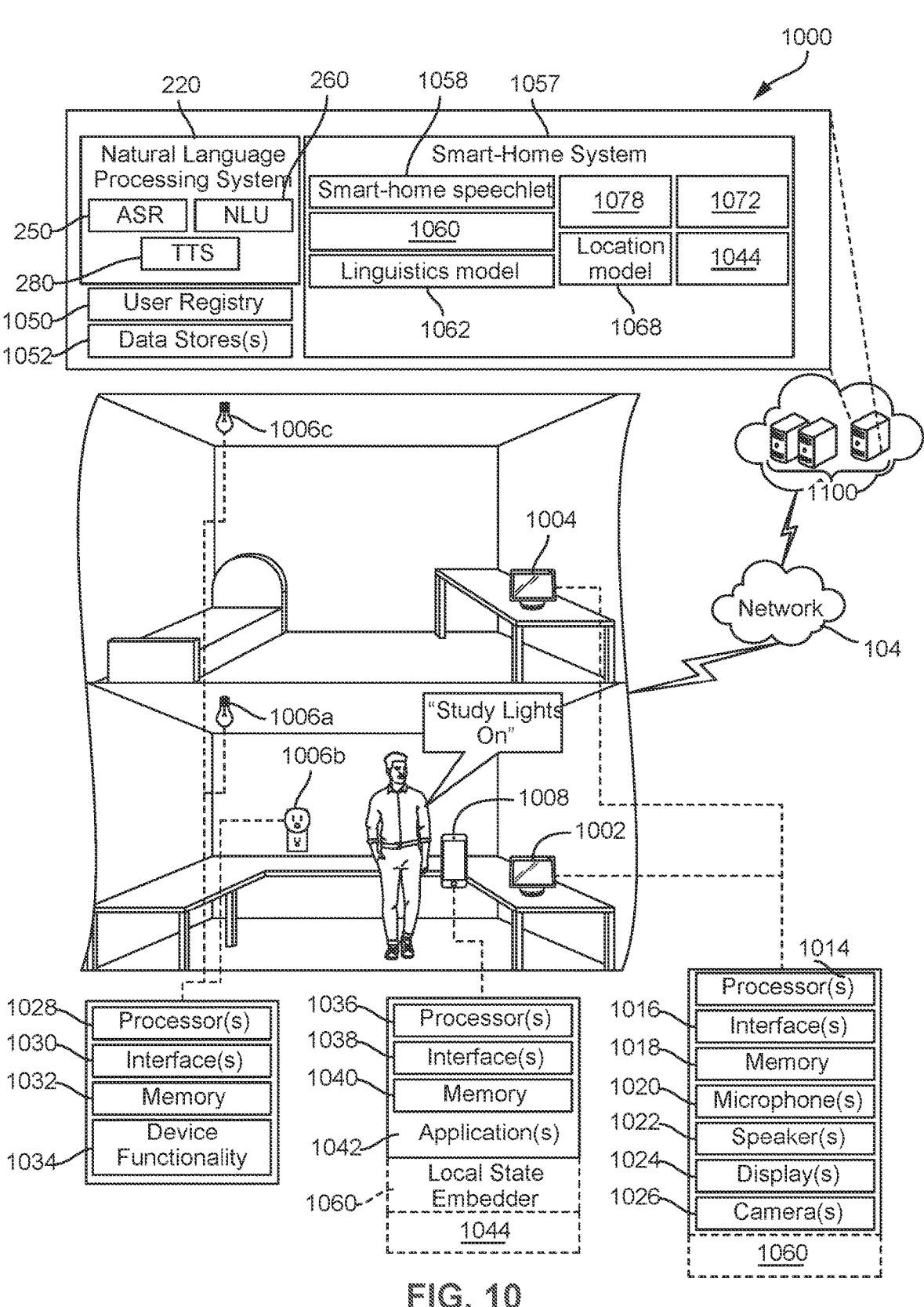
FIG. 10 illustrates a diagram of an example environment for implementing a local state embedder and action model for network-connected devices, in accordance with various examples.

FIG. 10 illustrates a diagram of an example environment and system 1000 for implementing a local state embedder and action model for network-connected devices, in accordance with various examples. The system 1000 may include, for example, a first voice-enabled device 1002 and a second voice-enabled device 1004. The first voice-enabled device 1002 and/or the second voice-enabled device 1004 may be configured to receive user utterances and perform operations in response to such user utterances. In these examples, the first voice-enabled device 1002 and/or the second voice-enabled device 1004 may be "hands free" such that interactions with the devices are performed through audible requests and responses. The first voice-enabled device 1002 may be located or otherwise situated in a first space. The second voice-enabled device 1004 may be located or otherwise situated in a second space. As shown by way of example in FIG. 1, the first voice-enabled device 1002 is located in an "office" while the second voice-enabled device 1004 is located in a "bedroom." It should be understood that the devices may be located in spaces other than those specifically mentioned in this disclosure. It should also be understood that while the spaces depicted in FIG. 1 are rooms, the spaces may be any space.

The system 1000 may also include one or more accessory devices 1006a-1006c. The accessory devices 1006a-c may be described as "smart" devices, which may have certain computing components and be configured to send and/or receive data from other devices. The accessory devices 1006a-c may be, for example, light bulbs, plugs, locks, televisions, appliances, doorbells, cameras, etc. As shown in FIG. 10, the first space in which the first voice-enabled device 1002 is situated may include a first accessory device 1006a, which may be a light bulb, and a second accessory device 1006b, which may be a plug. The accessory devices 1006a-c may be "paired" or otherwise associated with the first voice-enabled device 1002 and/or the second voice-enabled device 1004. As such, the accessory devices 1006a-c may be configured to send data to and/or receive data from the voice-enabled devices 1002, 1004. Likewise, the second space in which the second voice-enabled device 1004 is situated may include a third accessory device 1006c, which may be a light bulb. The third accessory device 1006c may be paired or otherwise associated with the voice-enabled devices 1002, 1004. The accessory devices 1006a-c may be associated with naming indicators, which may be provided by a user of the accessory devices 1006a-c, the remote system 1100, and/or one or more third-party systems.

The system 1000 may also include a personal device 1008, which may include a mobile device such as a mobile phone. The personal device 1008 may be associated with the voice-enabled devices 1002, 1004 and/or the accessory device 1006a-c. In these examples, the personal device 1008 may be configured to send data to and/or receive data from the voice-enabled devices 1002, 1004 and/or the accessory devices 1006a-c.

The first voice-enabled device 1002, the second voice-enabled device 1004, the accessory devices 1006a-c, and/or the personal device 1008 may be configured to send data to and/or receive data from a remote system 1100, such as via a network 104. In examples, one or more of the component of the system 1100 may communicate directly with the remote system 1100, via the network 104. In other examples, one or more of the accessory devices 1006a-c may communicate with one or more of the voice-enabled devices 1002, 1004, and the voice-enabled devices 1002, 1004 may communicate with the remote system 1100. Additionally, the personal device 1008 may communicate directly with the voice-enabled devices 1002, 1004, the accessory devices 1006a-c, and/or the remote system 1100. In further examples, a hub device, not shown in FIG. 1, may be utilized by the accessory devices 1006a-c and/or the voice-enabled devices 1002, 1004 to send data to and/or receive data from other devices.

The first voice-enabled device 1002 and/or the second voice-enabled device 1004 may include one or more components, such as, for example, one or more processors 1014, one or more network interfaces 1016, memory 1018, one or more microphones 1020, one or more speakers 1022, one or more displays 1024, and/or one or more cameras 1026. The microphones 1020 may be configured to capture audio, such as user utterances, and generate corresponding audio data. The speakers 1022 may be configured to output audio, such as audio corresponding to audio data received from another device and/or the remote system 1100. The displays 1024 may be configured to present images, such as images corresponding to image data received from another device and/or the remote system 1100. The cameras 1026 may be configured to capture images and to generate corresponding image data.

The accessory devices 1006*a-c* may include one or more components, such as, for example, one or more processors 1028, one or more network interfaces 1030, memory 1032, and/or device functionality components 1034. The memory 1032 and/or processors 1028 may be utilized to cause certain operations to be performed by the accessory devices 1006*a-c*, such as activating and/or deactivating the device functionality components 1034. The device functionality components 1034 may include components associated with the intended use of the accessory devices 1006*a-c*. For example, the first accessory device 1006*a* may be a light bulb, and in this example, the device functionality components 1034 may include a filament and/or light emitting diode that may produce and/or emit light. By way of further example, the second accessory device 1006*b* may be a wall plug, and in this example, the device functionality components 1034 may include an "on/off mechanism" for causing electricity to flow or not flow to a device that is plugged in to the wall plug. It should be noted that the device functionality components 1034 illustrated here are by way of example only.

The personal device 1008 may include one or more components such as, for example, one or more processors 1036, one or more network interfaces 1038, and memory 1040. The memory 1040 may include one or more components, such as, for example, one or more applications 1042. The applications 1042 may reside on the memory 1040 of the personal device 1008 and/or the applications 1042 may reside elsewhere, such as with the remote system 1100, and may be accessible via the personal device 1008. The applications 1042 may be configured to cause the processors 1036 to display one or more user interfaces associated with operations of the voice-enabled devices 1002, 1004 and/or the accessory devices 1006*a-c*. The user interfaces may be utilized to receive inputs from the user of the personal device 1008 and/or to provide content to the user.

The remote system 1100 may include components such as, for example, a user registry 1050, one or more data stores 1052, a natural language processing system 220, and/or a smart-home system 1057. The natural language processing system 220 may include an automatic speech recognition (ASR) component 250, a natural language understanding (NLU) component 260, and/or a text-to-speech (TTS) component 280. The smart-home system 1057 may include a smart-home speechlet 1058, local state embedder 160, one or more linguistics models 1062, a feature(s) database 1072, one or more task models 144, and/or a training component 1078. Each of the components described herein with respect to the remote system 1100 may be associated with their own systems, which collectively may be referred to herein as the remote system 1100, and/or some or all of the components may be associated with a single system. In examples, some or each of the components of the remote system 1100 may include their own processor(s), network interface(s), and/or memory. As such, by way of example, the natural language processing system 220 may include and/or be associated with processor(s), network interface(s), and/or memory. The smart-home system 1057 may include and/or be associated with different processor(s), network interface(s), and/or memory, or one or more of these components may utilize some or all of the same processor(s), network interface(s), and/or memory utilized by the natural language processing system 220. These components are described in detail below. Additionally, the operations and/or functionalities associated with and/or described with respect to the components of the remote system 1100 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 1050 may be configured to identify, determine, and/or generate associations between users, user accounts, and/or devices. For example, one or more associations between user profiles and user accounts may be identified, determined, and/or generated by the user registry 1050. The user registry 1050 may additionally store information indicating one or more applications and/or resources accessible to and/or enabled for a given user account. Additionally, the user registry 1050 may include information indicating device identifiers, such as naming identifiers, associated with a given user account, as well as device types associated with the device identifiers. The user registry 1050 may also include information indicating user account identifiers, naming indicators of devices associated with user accounts, and/or associations between voice-enabled devices 1002, 1004 and accessory devices 1006*a-c*. It should also be understood that the terms "user account" may be used to describe a set of data and/or functionalities associated with a given account identifier. For example, data identified, determined, and/or generated while using some or all of the system 1100 may be stored or otherwise associated with an account identifier. Data associated with the user accounts may include, for example, account access information, historical usage data, device-association data, and/or preference data.

The data stores 1052 may be configured to identify, determine, and/or generate data associated with use of the voice-enabled devices 1002, 1004 and/or the accessory devices 1006*a-c*. For example, the voice-enabled devices 1002, 1004 may be utilized to cause the accessory devices 1006*a-c* to operate. Usage data may be identified, determined, and/or generated that indicates some or each of these interactions. Timing data may also be identified, determined, and/or generated that indicates a time at which some or each of these interactions took place. Device-state data, prior-request data, and/or other usage data may also be identified, determined, and/or generated. It should be understood that while the user registry 1050 and the data stores 1052 are illustrated as separate components, the user registry 1050 and the data stores 1052 may be the same component.

The remaining components of the remote system 1100 that are illustrated in FIG. 10 will be described below by way of an example use case. It should be noted that this use case is provided for illustrative purposes, and not by way of limitation. For example, a user may speak a user utterance of "turn on study lights." The microphones 1020 of the voice-enabled device 1002 may capture audio corresponding to the user utterance and may generated audio data. The audio data may be sent, via the network 104, to the natural language processing system 220 for speech processing. The ASR component 250 may generate, based at least in part on the audio data, corresponding text data representing the text "turn on study lights." The NLU component 260 may generate, based at least in part on the text data, corresponding intent data indicating that the user utterance corresponds to a "turn on" intent and the device to be acted upon, otherwise described herein as the payload, is associated with the identifier "study lights." The ASR component 250 and the NLU component 260 are described in more detail below with respect to FIG. 10. The "turn on" intent may be associated with intents assigned to and/or otherwise associated with the smart-home system 1057.

The smart-home speechlet 1058 of the smart-home system 1057 may be configured to receive some or all of the intent data and attempt to determine which accessory device 1006*a-c* is associated with the "study lights" identifier. The smart-home speechlet 1058, and/or another component of the remote system 1100, may determine whether the identifier corresponds to one or more naming indicators associated with the accessory devices 1006*a-c*. In the examples used herein, the identifier may not correspond to a naming indicator and/or the identifier (e.g., a deviceID) may correspond to more than one naming indicator. In these and other examples, the remote system 1100 may perform target-device resolution to determine which accessory device to "turn on."

As shown, the local state embedder 160 and/or the task models 144 may be executed locally by one of the smart devices (e.g., personal device 1008, voice-enabled device 1002, etc.) and/or may be executed in the cloud (e.g., by smart-home system 1057). Once a triggering event has occurred (e.g., the user saying "Study Lights On"), features may be generated for input into the pertinent task model 144. For example, the linguistics model(s) 1062 may utilize the identifier from the user utterance (e.g., "Study Lights") and the naming indicators of the accessory devices 1006*a-c* to determine semantic similarities for some or all identifier/naming indicator pairs. The features generated by the linguistics model(s) 1062 may include semantic-similarity scores for some or all of the pairs, with the most favorable score being associated with the naming indicator that was determined by the linguistic model(s) 1062 to be most semantically similar to the identifier from the user utterance. For example, with an identifier of "study light," a more favorable similarity score would be determined for the naming indicator "office light" than the naming indicator for "kitchen light" because "study" and "office" are more semantically similar than "study" and "kitchen." These features may be configured to be input include the task models 144 and/or may be stored in the feature(s) database 1072 for use by the task model(s) 144. Additionally, in some cases, the hidden state embedding representing the home device state may be stored in feature(s) database 1072 (and/or in other persistent memory) for use by task model(s) 144, as previously described.

In some examples, or instead of, using the linguistics model(s) 1062, the remote system 1100 may utilize the location model 1068 to perform target-device resolution. By way of example, the location model 1068 may utilize the identifier from the user utterance to determine if the identifier corresponds to an environment naming indicator, such as "kitchen," "office," and/or "living room," for example. The features generated by the location model 1068 may include confidence scores associated with the identifier corresponding to an environment naming indicator, with the most favorable score being associated with the environment naming indicator that most closely corresponds to the identifier. By way of example, if the user utterance includes "turn on the kitchen lights." The location model 1068 may identify "kitchen" as an environment naming indicator and may utilize that information to determine which accessory device 1006*a-c* associated with the "kitchen" and/or with a naming indicator of "kitchen" is most likely to correspond to "kitchen lights" from the user utterance. Additionally, or alternatively, the location model 1068 may be configured to receive weather data indicating weather conditions at or near a location where the voice-enabled device 1002 and/or the accessory devices 1006*a-c* situated. The weather data may be utilized to determine, for example, lighting conditions at the location and/or within a given space. For example, in instances where the weather data indicates that it is currently sunny and 95 degrees at the location, it may be less likely that the user utterance corresponds to a request to turn on lights in a living room area. By way of further example, in stances where the weather data indicates that it is currently cloudy and/or rainy, it may be more likely that the user utterance corresponds to a request to turn on lights in a living room area.

Additionally, or alternatively, the remote system 1100 may be configured to utilize the prior-request data to generate features that include prior-request scores. For example, multiple accessory devices 1006*a-c* may be associated with a voice-enabled device 1002, 1004, and the prior-request data may indicate a time at which a given accessory device 1006*a-c* was operated in response to a user utterance. The accessory device 1006*a-c* that was operated closest in time to when the audio data was received may be more likely to correspond to the target accessory device than other accessory devices 1006*a-c*. For example, a previous user utterance may have been "turn on Bedroom Light." Thereafter, another user utterance received 10 minutes later may be "turn off light." The prior-request data may indicate the time at which the Bedroom Light was turned on, and upon receiving the audio data corresponding to the user utterance of "turn off light," the remote system 1100 may determine, as a feature for input into the task models 144, a prior-request score.

Additionally, or alternatively, the remote system 1100 may be configured to utilize the current device state and/or the hidden state embedding 136 to generate features that include device-state scores and/or an embedding representing the current and historical state of one or more of the devices communicating on the local network. For example, the accessory devices 1006*a-c* may be associated with states, such as "on," "off," "idle," "active," etc. A user utterance may include "turn off the light." In this example, the intent may be to deactivate or otherwise turn off an accessory device 1006*a-c*, but an identifier of the accessory device 1006*a-c* was not provided. However, only a portion or only one accessory device 1006*a-c* may be in a state that is "on" or similar, and this information can be used by the remote system 1100 to determine that other accessory devices 1006*a-c* that are already in an "off" state are not likely candidates for target-device resolution. Device-state scores may be determined by the remote system 1100 as features for input into the task model(s) 144.

The various features that are generated in response to triggering event and/or are otherwise generated for ingestion by the task model(s) 144 may be stored, in examples, in a feature(s) database 1072 (e.g., a persistent memory store) and may be retrieved by the task models 144 along with the hidden state embedding 136 and/or device specific embedding to perform specific actions and/or to recommend actions.

Based at least in part on the features as described herein, the task model(s) 144 may determine which accessory devices 1006*a-c* are most likely to correspond to the accessory device intended to be acted upon. The task model(s) 144 may lookup the appropriate DSE and the HSE, as well as the task-specific features from the feature(s) database 1072 and/or from other persistent memory.

The speechlet(s) described herein may include a speech-enabled web component that may run in the remote system 1100. Speechlet(s) may receive and respond to speech-initiated requests. Speechlet(s) may define life-cycle events for a skill as experienced by a user, a way to process speech requests from the user, and/or call-backs from events happening on the device the user is interacting with. Given speechlet(s) may be capable of handling certain intents. For example, the NLU component may generate intent data that indicates an intent as well as a payload associated with the intent. A speechlet may be associated with the intent, and thus the intent data, including the payload may be sent to and received by the speechlet. The speechlet may process that intent by analyzing the payload and generating data representing a directive and/or instruction to perform an action. The directive and/or instruction may be sent to other components of the system for performance of the action.

As used herein, a processor, such as processor(s) 1014, 1028, 1036, and/or 1044, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 1014, 1028, 1036, and/or the processor(s) described with respect to the components of the remote system 1100 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 1014, 1028, 1036, and/or the processor(s) described with respect to the components of the remote system 1100 may possess its own local memory, which also may store program components, program data, and/or one or more operating systems.

The memory 1018, 1032, 1040, and/or the memory described with respect to the components of the remote system 1100 may include volatile and nonvolatile memory, removable and non-removable media implemented in any method or technology for storage of information, such as computer-readable instructions, data structures, program component, or other data. Such memory 1018, 1032, 1040, and/or the memory described with respect to the components of the remote system 1100 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 1018, 1032, 1040, and/or the memory described with respect to the components of the remote system 1100 may be implemented as computer-readable storage media ("CRSM"), which may be any available physical media accessible by the processor(s) 1014, 1026, 1036, and/or the processor(s) described with respect to the components of the remote system 1100 to execute instructions stored on the memory 1018, 1032, 1040, and/or the memory described with respect to the components of the remote system 1100. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The network interface(s) 1016, 1030, 1038, and/or the network interface(s) described with respect to the components of the remote system 1100 may enable messages between the components and/or devices shown in system 1100 and/or with one or more other remote systems, as well as other networked devices. Such network interface(s) 1016, 1030, 1038, and/or the network interface(s) described with respect to the components of the remote system 1100 may include one or more network interface controllers (NICs) or other types of transceiver devices to send and receive messages over the network 104.

For instance, each of the network interface(s) 1016, 1030, 1038, and/or the network interface(s) described with respect to the components of the remote system 1100 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 1016, 1030, 1038, and/or the network interface(s) described with respect to the components of the remote system 1100 may include a wide area network (WAN) component to enable message over a wide area network.

In some instances, the remote system 1100 may be local to a space associated the first voice-enabled device 1002 and/or the second voice-enabled device 1004. For instance, the remote system 1100 may be located within the first voice-enabled device 1002 and/or the second voice-enabled device 1004. In some instances, some or all of the functionality of the remote system 1100 may be performed by the first voice-enabled device 1002 and/or the second voice-enabled device 1004. Also, while various components of the remote system 1100 have been labeled and named in this disclosure and each component has been described as being configured to cause the processor(s) 1044 to perform certain operations, it should be understood that the described operations may be performed by some or all of the components and/or other components not specifically illustrated.

Figure 11:
FIG. 11 illustrates a conceptual diagram of a smart-home system including a local state embedder, in accordance with various aspects of the present disclosure.

FIG. 11 illustrates a conceptual diagram of a smart-home system including a local state embedder, in accordance with various aspects of the present disclosure. The smart-home system 1157 may include components described above with respect to FIG. 10, such as a smart-home speechlet 1058, and a local state embedder 160. The smart-home system 1157 may also be configured to send data to and receive data from other components of a remote system and/or one or more other systems. For example, the other components may include a natural language processing system 220, and one or more data stores 1052. The smart-home system 1157 may also include components such as a smart-home orchestrator 1204, a smart-home graphical user interface (GUI) 1206, and/or an internet-of-things component 1106. Each of these components will be described in detail below.

As described herein, a user may interact with an accessory device using tactile input to the accessory device, voice input to a voice-enabled device, and/or input to an application residing on and/or accessible to a personal device.

When a user interacts with an accessory device using voice input to a voice-enabled device, audio data representing user utterances may be received at the natural language processing system 220. The natural language processing system 220 may analyze the audio data and/or corresponding text data generated, by way of example, using an ASR component, to determine that the user utterance represents an intent to control an accessory device. To determine the intent associated with the user utterance, the natural language processing system 220 may utilize a smart-home entity-recognition component 1202, which may be utilized to inform one or more intents available to the natural language processing system 220 and/or to inform one or more values associated with the intents. For example, the user utterance of "turn off bedroom lights" may be analyzed by the speech-recognition component 250. The smart-home entity-recognition component 1202 may train or otherwise provide data to the natural language processing system 220 indicating intents associated with operation of accessory devices, such as "turn on," "turn off," "activate," "deactivate," "dim," "brighten," "lock," "unlock," etc. The smart-home entity-recognition component 1202 may additionally, or alternatively, provide data indicating identifiers and/or payloads associated with such intents, such as "light," "lights," "lock," "outlet," "switch," etc. It should be understood that while the smart-home entity-recognition component 1202 is depicted in FIG. 11 as being a component separate from the smart-home system 1157, the smart-home entity-recognition component 1202 may be a component of the smart-home system 1157.

The natural language processing system 220 may be configured to determine that the intent corresponds to an operation configured to be performed by the smart-home system 1157, and based at least in part on such a determination, the natural language processing system 220 may provide the intent data and/or other data associated with the request to the smart-home speechlet 1158 of the smart-home system 1157. The smart-home orchestrator 1204 may be configured to receive data indicating that the smart-home speechlet 1158 has been invoked to determine a directive to be performed with respect to an accessory device and may query one or more other components of the smart-home system 1157 to effectuate the request. For example, the smart-home orchestrator 1204 may query the internet-of-things component 1106 to identify naming indicators associated with accessory devices for a particular user account. The internet-of-things component 1106 may query the data store(s) 1052 and/or the user account for such naming indicators. The internet-of-things component 1106 may return the naming indicators to the smart-home speechlet 1158, which may identify which naming indicator corresponds to the identified target device from the user utterance.

Additionally, or alternatively, as mentioned above, the accessory devices may be operated based at least in part on input data received from an application residing on and/or accessible to a personal device, such as a mobile phone and/or computer. The smart-home GUI 1206 may be utilized to receive the input data and/or to display recommendations and/or requests to a user. For example, the smart-home GUI 1206 may be utilized to display a request to confirm that a selected accessory device is the desired device to be acted upon.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:

determining, for a first time period, first data representing a change in a state of at least one network-connected computing device configured in communication with a network;

determining, for the first time period, second data representing a device crossing a perimeter defined by a geofence;

generating a first vector representing the first data and the second data using an encoder, wherein generation of the first vector is triggered by the device crossing the perimeter defined by the geofence;

sending the first vector as an input into a recurrent neural network (RNN);

generating, by the RNN, first embedding data representing a combination of the first vector at a current time step and hidden state data comprising a representation previous inputs to the RNN, wherein the hidden state data was generated during a previous time step prior to the current time step, and wherein the hidden state data represents a previous state of the at least one network-connected computing device;

determining, after generating the first embedding data, a triggering event associated with performance of a first action by a first network-connected computing device;

generating feature data describing the triggering event, wherein the feature data is used as input by a task-specific machine learning model associated with the first action, wherein the task-specific machine learning model is different from the RNN;

inputting the feature data and the first embedding data into the task-specific machine learning model associated with the first action; and generating output data by the task-specific machine learning model effective to cause the first network-connected computing device to perform the first action.

2. The method of claim 1, further comprising:

generating, by the RNN for the current time step, second embedding data specific to the first network-connected computing device, the second embedding data representing historical state data of the first network-connected computing device calculated at the previous time step;

determining, from among embedding data stored by the RNN in response to the triggering event, that the second embedding data is specific to the first network-connected computing device using a lookup operation to determine the second embedding data that is specific to the first network-connected computing device; and inputting the second embedding data into the task-specific machine learning model associated with the first action, wherein the output data is generated using the first embedding data, the second embedding data, and the feature data.

3. The method of claim 1, wherein the current time step corresponds to a first time period, the method further comprising:

determining that a threshold amount of time has elapsed since the first time period has ended;

determining, for a second time period following the first time period, third data representing a second change in the state of at least one network-connected computing device configured in communication with the network;

generating a second numeric representation of the third data using the encoder;

sending the second numeric representation as a second input into the RNN;

generating, by the RNN, second embedding data representing a combination of the first embedding data and the second numeric representation;

determining an out-of-cycle triggering event that has occurred prior to the threshold amount of time elapsing since the second time period has ended;

determining, in response to the out-of-cycle triggering event occurring, fourth data representing a third change in the state of at least one network-connected computing device following the second time period;

generating a third numeric representation of the fourth data using the encoder;

sending the third numeric representation as a third input into the RNN;

generating, by the RNN, third embedding data representing a combination of the second embedding data and the third numeric representation; and storing the third numeric representation in memory, the third numeric representation representing current state data and historical state data for the at least one network-connected computing device configured in communication with the network.

4. A method comprising:

determining first data representing first states of computing devices configured in communication with a first network;

inputting the first data into a first trained machine learning model;

generating, by the first trained machine learning model, first embedding data representing a combination of the first data and second data, the second data representing historical state data for the computing devices;

storing the first embedding data in persistent memory;

determining, using at least one of the computing devices, that a first event has occurred;

receiving, from the persistent memory, the first embedding data based at least in part on the first event having occurred; and performing a first action by a first computing device based at least in part on the first embedding data and the first event.

5. The method of claim 4, further comprising:

aggregating the first data over a first time period;

determining that the first time period has elapsed; and encoding the first data to generate first encoded data, wherein the first encoded data is used by the first trained machine learning model to generate the first embedding data.

6. The method of claim 4, further comprising generating the first embedding data using the first data and hidden state data of a recurrent neural network (RNN).

7. The method of claim 4, further comprising:

determining that the first event is associated with a first computing device of the computing devices;

generating feature data associated with at least one of the first event or the first computing device;

determining, by a second machine learning model using the feature data and the first embedding data, the first action performed by the first computing device; and sending instructions to the first computing device effective to cause the first computing device to perform the first action.

8. The method of claim 7, further comprising:

determining, based at least in part on the first event occurring, device-specific embedding data that was stored in the persistent memory prior to the first event occurring, the device-specific embedding data representing state change data specific to the first computing device, wherein the first action is determined by the second machine learning model further based at least in part on the device-specific embedding data.

9. The method of claim 4, further comprising:

determining third data representing a natural language input used to invoke a natural language processing system;

determining fourth data representing a response to the natural language input, the response comprising synthesized speech output by the natural language processing system;

determining aggregated data comprising the third data and the fourth data;

generating, by the first trained machine learning model, second embedding data representing a combination of the aggregated data and the first embedding data; and storing the second embedding data in the persistent memory.

10. The method of claim 4, further comprising periodically generating, by the first trained machine learning model, updated embedding data using the first embedding data and aggregated state data of the computing devices determined during a previous time period.

11. The method of claim 10, further comprising:

determining a second event that has occurred prior to a periodic update of embedding data generated by the first trained machine learning model;

determining that the second event is of a type of events that triggers an out-of-cycle update of the embedding data; and generating, by the first trained machine learning model, updated embedding data using the first embedding data and second embedding data related to the second event.

12. The method of claim 10, further comprising:

determining that a first computing device has crossed a geofence;

generating, by the first trained machine learning model, updated embedding data based at least in part on the first computing device crossing the geofence; and storing the updated embedding data in the persistent memory.

13. A system comprising:

at least one processor; and non-transitory computer-readable memory storing instructions that, when executed by the at least one processor, are effective to:

determine first data representing first states of computing devices configured in communication with a first network;

input the first data into a first trained machine learning model;

generate, by the first trained machine learning model, first embedding data representing a combination of the first data and second data, the second data representing historical state data for the computing devices;

store the first embedding data in persistent memory;

determine, using at least one of the computing devices, that a first event has occurred;

receive, from the persistent memory, the first embedding data based at least in part on the first event having occurred; and perform a first action by a first computing device based at least in part on the first embedding data and the first event.

14. The system of claim 13, the non-transitory computer-readable memory storing further instructions that, when executed by the at least one processor, are further effective to:

aggregate the first data over a first time period;

determine that the first time period has elapsed; and encode the first data to generate first encoded data, wherein the first encoded data is used by the first trained machine learning model to generate the first embedding data.

15. The system of claim 13, the non-transitory computer-readable memory storing further instructions that, when executed by the at least one processor, are further effective to:

generate the first embedding data using the first data and hidden state data of a recurrent neural network (RNN).

16. The system of claim 13, the non-transitory computer-readable memory storing further instructions that, when executed by the at least one processor, are further effective to:

determine that the first event is associated with a first computing device of the computing devices;

generate feature data associated with at least one of the first event or the first computing device;

determine, by a second machine learning model using the feature data and the first embedding data, the first action performed by the first computing device; and send instructions to the first computing device effective to cause the first computing device to perform the first action.

17. The system of claim 16, the non-transitory computer-readable memory storing further instructions that, when executed by the at least one processor, are further effective to:

determine, based at least in part on the first event occurring, device-specific embedding data that was stored in the persistent memory prior to the first event occurring, the device-specific embedding data representing state change data specific to the first computing device, wherein the first action is determined by the second machine learning model further based at least in part on the device-specific embedding data.

18. The system of claim 13, the non-transitory computer-readable memory storing further instructions that, when executed by the at least one processor, are further effective to:

determine third data representing a natural language input used to invoke a natural language processing system;

determine fourth data representing a response to the natural language input, the response comprising synthesized speech output by the natural language processing system;

determine aggregated data comprising the third data and the fourth data;

generate, by the first trained machine learning model, second embedding data representing a combination of the aggregated data and the first embedding data; and store the second embedding data in the persistent memory.

19. The system of claim 13, the non-transitory computer-readable memory storing further instructions that, when executed by the at least one processor, are further effective to:

periodically generate, by the first trained machine learning model, updated embedding data using the first embedding data and aggregated state data of the computing devices determined during a previous time period.

20. The system of claim 19, the non-transitory computer-readable memory storing further instructions that, when executed by the at least one processor, are further effective to:

determine a second event that has occurred prior to a periodic update of embedding data generated by the first trained machine learning model;

determine that the second event is of a class of events that triggers an out-of-cycle update of the embedding data; and generate, by the first trained machine learning model, the updated embedding data using the first embedding data and second embedding data related to the second event.

\* \* \* \* \*